(12) United States Patent
Gintz

(10) Patent No.: US 10,283,950 B2
(45) Date of Patent: May 7, 2019

(54) RELEASABLE HOLDER FOR CABLES AND CONDUIT

(71) Applicant: William Gary Gintz, Boise, ID (US)

(72) Inventor: William Gary Gintz, Boise, ID (US)

(73) Assignee: STICNSTAC LLC, Boise, ID (US)

( * ) Notice: Subject to any disclaimer, the term of this patent is extended or adjusted under 35 U.S.C. 154(b) by 0 days.

(21) Appl. No.: 15/836,766

(22) Filed: Dec. 8, 2017

(65) Prior Publication Data

US 2018/0109096 A1  Apr. 19, 2018

Related U.S. Application Data

(63) Continuation of application No. 15/239,686, filed on Aug. 17, 2016, now abandoned.

(60) Provisional application No. 62/209,213, filed on Aug. 24, 2015.

(51) Int. Cl.
*H02G 3/32* (2006.01)
*H02G 3/30* (2006.01)

(52) U.S. Cl.
CPC .............. *H02G 3/32* (2013.01); *H02G 3/305* (2013.01)

(58) Field of Classification Search
CPC . F16L 3/1075; F16L 3/23; H02G 3/32; H02G 3/305
USPC ....................... 248/74.1, 74.4, 74.5, 74.2, 49
See application file for complete search history.

(56) References Cited

U.S. PATENT DOCUMENTS

| | | | |
|---|---|---|---|
| 1,818,625 A | 8/1931 | Hunter | |
| 2,310,622 A | 2/1943 | Ellinwood | |
| 2,408,572 A | 10/1946 | Morehouse | |
| 2,409,772 A | 10/1946 | Lund | |
| 2,417,261 A | 3/1947 | Morehouse | |
| 2,491,290 A | 12/1949 | Tinnerman | |
| 2,588,251 A | 3/1952 | Kost | |
| 2,868,489 A | 1/1959 | Calcut | |
| 2,921,607 A | 1/1960 | Caveney | |
| 2,937,834 A | 5/1960 | Orenick et al. | |
| 2,972,461 A | 2/1961 | Balbach et al. | |
| 2,974,916 A | 3/1961 | Richey | |
| 3,370,815 A | 2/1968 | Opperthauser | |
| 3,460,788 A | 8/1969 | Goldman | |
| 3,471,109 A | 10/1969 | Meyer | |
| 3,516,631 A | 6/1970 | Santucci | |
| 3,632,070 A | 1/1972 | Thayer | |
| 3,637,177 A | 1/1972 | Santucci | |
| 3,659,319 A | 5/1972 | Erickson | |
| 3,786,171 A * | 1/1974 | Shira .................... | H02G 3/0425 138/108 |

(Continued)

FOREIGN PATENT DOCUMENTS

DE   102006025706 A1   12/2007
EP         2730827 A1    5/2014

(Continued)

OTHER PUBLICATIONS

Canadian Intellectual Property Office, Office Action for Canadian Patent Application No. 2,939,544, dated Jul. 27, 2017, 5 pages.

(Continued)

*Primary Examiner* — Kimberly T Wood
(74) *Attorney, Agent, or Firm* — Kolisch Hartwell, P.C.

(57) ABSTRACT

A cable support for securing wires and cables to an underlying structure without the use of tools and allows the cable support to be opened or closed to add or remove cables and wires. The cable support may further include padding material or impediments for protecting and securing the wires and cables in place.

15 Claims, 37 Drawing Sheets

(56) References Cited

U.S. PATENT DOCUMENTS

| | | | |
|---|---|---|---|
| 3,823,443 A * | 7/1974 | Takabayashi | A44B 11/12 24/186 |
| 3,847,331 A | 11/1974 | Vallinotto et al. | |
| 3,894,706 A | 7/1975 | Mizusawa | |
| 3,913,187 A | 10/1975 | Okuda | |
| 3,991,960 A | 11/1976 | Tanaka | |
| 4,068,912 A * | 1/1978 | Hudson, Jr. | H01R 12/675 29/857 |
| 4,131,257 A | 12/1978 | Sterling | |
| 4,260,123 A | 4/1981 | Ismert | |
| 4,291,855 A | 9/1981 | Schenkel et al. | |
| 4,317,262 A | 3/1982 | Wells, Jr. | |
| 4,356,599 A * | 11/1982 | Larson | F16L 3/12 24/16 PB |
| 4,395,009 A | 7/1983 | Bormke | |
| 4,397,438 A | 8/1983 | Chapman | |
| 4,439,896 A | 4/1984 | Matsui | |
| 4,440,374 A | 4/1984 | Achille | |
| 4,442,994 A | 4/1984 | Logsdon | |
| 4,601,447 A | 7/1986 | McFarland | |
| 4,609,171 A | 9/1986 | Matsui | |
| 4,623,102 A | 11/1986 | Hough, Jr. | |
| 4,635,886 A * | 1/1987 | Santucci | F16L 3/12 24/543 |
| 4,650,925 A * | 3/1987 | Coldren | H02G 3/32 174/135 |
| 4,669,156 A | 6/1987 | Guido et al. | |
| 4,669,688 A | 6/1987 | Itoh et al. | |
| 4,796,848 A | 1/1989 | Lanz | |
| 4,923,153 A * | 5/1990 | Matsui | H02G 3/26 24/178 |
| 4,942,271 A * | 7/1990 | Corsi | H02G 3/0418 138/162 |
| 5,090,645 A | 2/1992 | Zuercher | |
| 5,201,484 A | 4/1993 | Thoen | |
| 5,224,674 A | 7/1993 | Simons | |
| 5,230,489 A | 7/1993 | White et al. | |
| 5,401,905 A * | 3/1995 | Lesser | H02G 3/26 138/108 |
| 5,612,509 A | 3/1997 | Market | |
| 5,653,411 A * | 8/1997 | Picco | F16L 3/2235 24/339 |
| 5,669,590 A * | 9/1997 | Przewodek | F16L 3/221 248/68.1 |
| 5,784,249 A | 7/1998 | Pouliot | |
| D407,963 S | 4/1999 | Gretz et al. | |
| 5,961,081 A | 10/1999 | Rinderer | |
| 5,967,468 A | 10/1999 | Veghte et al. | |
| 5,992,802 A | 11/1999 | Campbell | |
| 6,126,123 A * | 10/2000 | Yang | B60R 16/0215 248/74.1 |
| 6,142,429 A | 11/2000 | Ahroni | |
| 6,164,603 A * | 12/2000 | Kawai | F16L 3/23 24/297 |
| 6,222,128 B1 | 4/2001 | Gretz | |
| 6,254,042 B1 | 7/2001 | Kogure et al. | |
| 6,313,406 B1 | 11/2001 | Gretz | |
| 6,349,904 B1 | 2/2002 | Polad | |
| 6,378,813 B1 | 4/2002 | Gretz | |
| 6,382,569 B1 | 5/2002 | Schattner et al. | |
| 6,427,952 B2 | 8/2002 | Caveney et al. | |
| 6,431,502 B1 | 8/2002 | Goodman | |
| 6,434,803 B1 * | 8/2002 | Spong | A47G 25/145 24/30.5 P |
| 6,494,411 B1 | 12/2002 | Bjorklund | |
| 6,513,766 B1 | 2/2003 | Gretz | |
| 6,528,728 B1 * | 3/2003 | Shima | H02G 3/0437 174/101 |
| 6,561,465 B2 | 5/2003 | Kondo | F16L 3/1025 174/135 |
| 6,655,644 B1 | 12/2003 | Gretz | |
| 6,732,983 B1 * | 5/2004 | Blake | F16L 3/1236 248/74.2 |
| 6,923,407 B2 | 8/2005 | Takeuchi | |
| 6,996,943 B2 | 2/2006 | Denier et al. | |
| 7,007,900 B2 | 3/2006 | Goodwin et al. | |
| 7,037,025 B2 * | 5/2006 | Takahashi | F16B 5/123 24/24 |
| 7,097,142 B1 | 8/2006 | Schmidt | |
| 7,150,439 B2 | 12/2006 | Konold | |
| 7,228,048 B1 * | 6/2007 | Dunfee | H02G 3/32 385/136 |
| 7,301,101 B2 * | 11/2007 | Suzuki | H02G 3/30 174/117 F |
| 7,304,861 B2 | 12/2007 | Takahashi | |
| 7,347,401 B1 | 3/2008 | Gretz | |
| 7,381,907 B1 | 6/2008 | Frusco | |
| 7,405,923 B2 | 7/2008 | Kelly et al. | |
| 7,507,906 B2 * | 3/2009 | Suzuki | H02G 3/32 174/117 F |
| 7,608,782 B2 | 10/2009 | Hill | |
| 7,616,432 B2 | 11/2009 | Luebke et al. | |
| 7,628,447 B2 * | 12/2009 | Sugimoto | B60R 13/02 248/49 |
| 7,784,751 B1 | 8/2010 | Bellows et al. | |
| 7,810,762 B2 * | 10/2010 | Condon | F16L 5/02 248/65 |
| 7,988,110 B1 * | 8/2011 | Liang | H05K 7/12 248/221.11 |
| 8,157,222 B1 * | 4/2012 | Shirey | H02G 3/32 248/68.1 |
| D663,274 S | 7/2012 | Gretz | |
| 8,505,858 B2 | 8/2013 | Hansen | |
| D702,198 S | 4/2014 | Gretz | |
| 8,708,289 B2 | 4/2014 | Allenbach et al. | |
| 8,729,408 B2 | 5/2014 | Pawlak | |
| 8,757,560 B2 | 6/2014 | Darnell | |
| 8,757,562 B2 | 6/2014 | Fujiwara | |
| 2001/0022231 A1 | 9/2001 | Dyer | |
| 2001/0023778 A1 * | 9/2001 | Kondoh | B60R 16/0215 174/135 |
| 2001/0030267 A1 | 10/2001 | Caveney et al. | |
| 2003/0164430 A1 | 9/2003 | Walraven | |
| 2004/0004164 A1 | 1/2004 | Chen | |
| 2005/0011996 A1 | 1/2005 | Geater | |
| 2006/0006292 A1 | 1/2006 | Kleeb et al. | |
| 2007/0137888 A1 * | 6/2007 | Takahashi | H02G 3/32 174/260 |
| 2007/0246616 A1 | 10/2007 | Budagher | |
| 2008/0045076 A1 * | 2/2008 | Dittmann | H01R 23/661 439/495 |
| 2008/0083093 A1 | 4/2008 | Saltenberger et al. | |
| 2009/0179120 A1 | 7/2009 | Kroening et al. | |
| 2009/0212173 A1 | 8/2009 | Rueckwald | |
| 2010/0258685 A1 | 10/2010 | Gardner et al. | |
| 2011/0315830 A1 | 12/2011 | Eshima et al. | |
| 2012/0006947 A1 | 1/2012 | Gundel et al. | |
| 2012/0037766 A1 | 2/2012 | Buras, Jr. et al. | |
| 2012/0132465 A1 * | 5/2012 | Mabuchi | B60R 16/0215 174/72 A |
| 2012/0145837 A1 * | 6/2012 | Li | H02G 3/32 248/74.2 |
| 2012/0145838 A1 * | 6/2012 | Chiu | H02G 3/32 248/74.2 |
| 2012/0217354 A1 | 8/2012 | Walraven et al. | |
| 2012/0281958 A1 | 11/2012 | Petersen et al. | |
| 2013/0193279 A1 | 8/2013 | Tanaka | |
| 2014/0217244 A1 | 8/2014 | Shiga | |
| 2015/0187460 A1 * | 7/2015 | DeLoache | H02G 3/305 248/68.1 |
| 2015/0292648 A1 * | 10/2015 | Jimenez | F16B 1/00 248/68.1 |

FOREIGN PATENT DOCUMENTS

JP    2008116047 A    5/2008

(56) References Cited

FOREIGN PATENT DOCUMENTS

| JP | 2009225616 A | 10/2009 |
|----|--------------|---------|
| JP | 2011153663 A | 8/2011  |

OTHER PUBLICATIONS

United States Patent and Trademark Office, Final Office Action for U.S. Appl. No. 15/239,686, dated Jun. 9, 2017, 13 pages.
United States Patent and Trademark Office, Non Final Office Action for U.S. Appl. No. 15/239,686, dated Mar. 7, 2017, 23 pages.

* cited by examiner

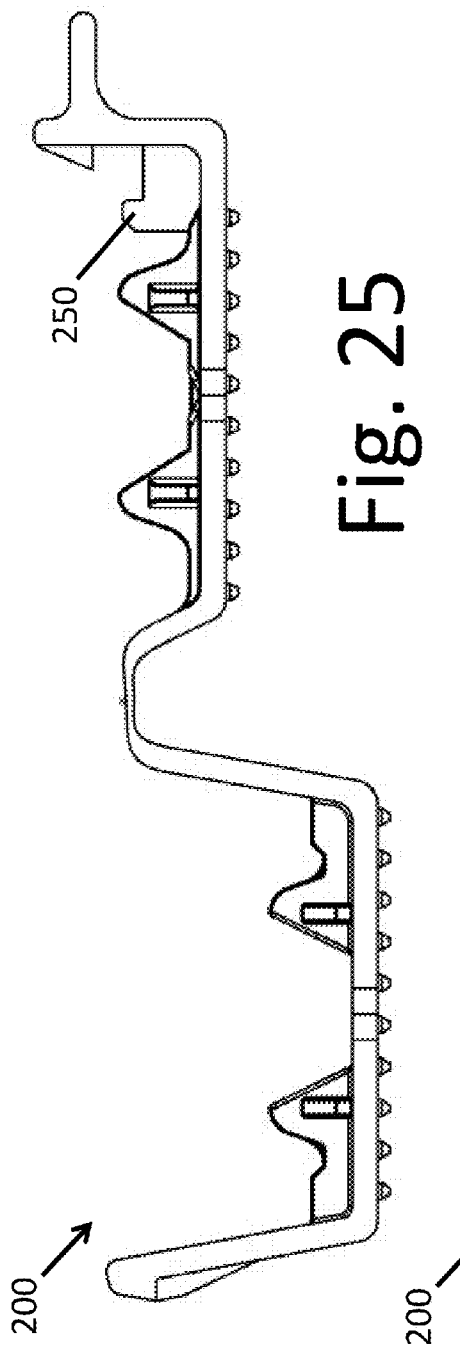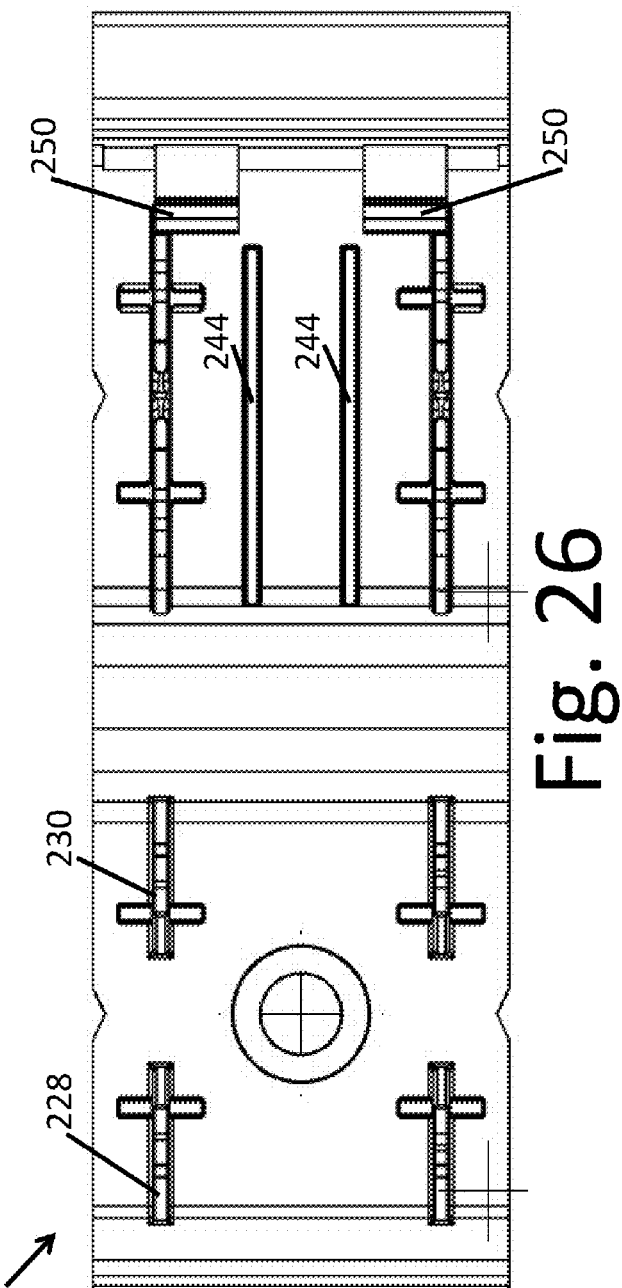

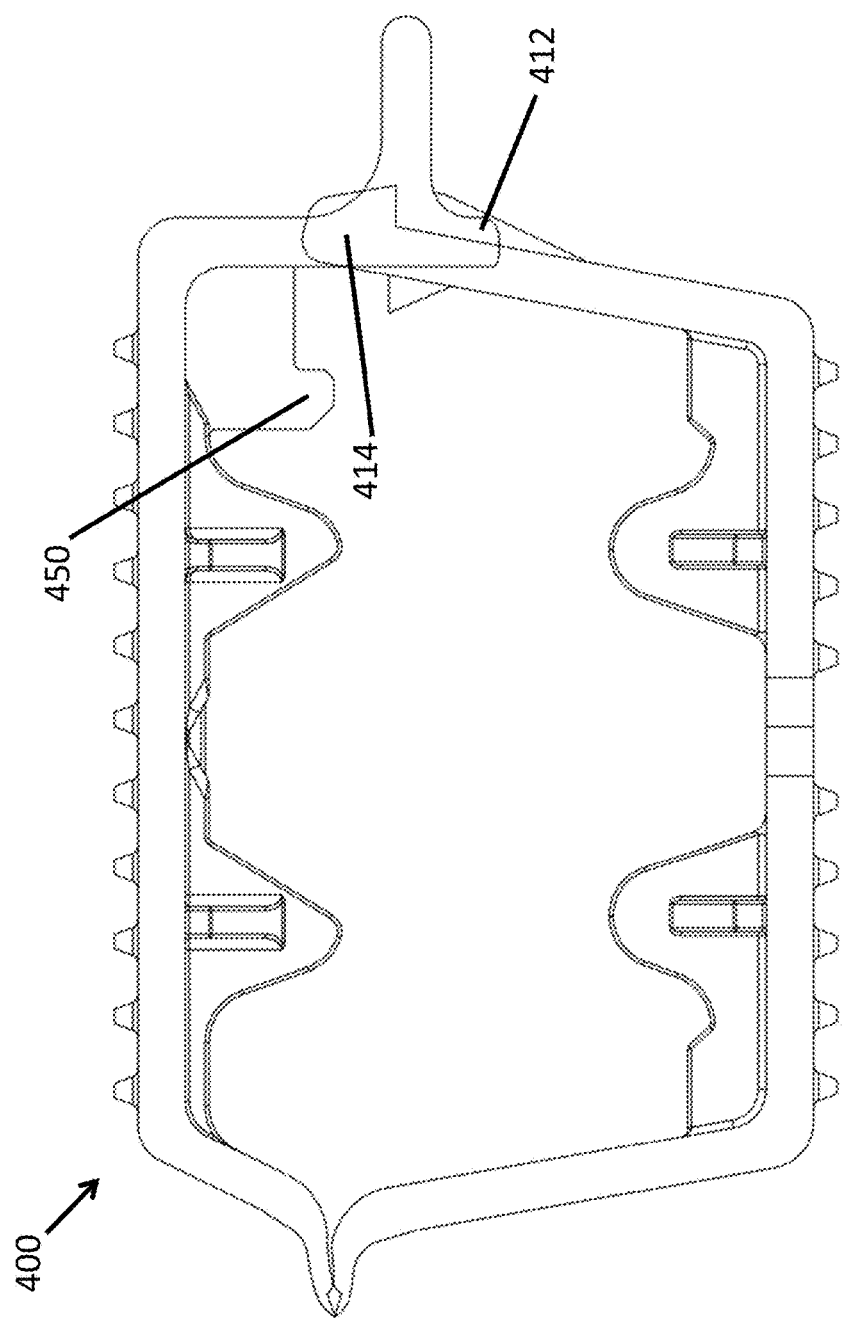

RELEASABLE HOLDER FOR CABLES AND CONDUIT

CROSS-REFERENCE TO RELATED APPLICATIONS

This application is a continuation of U.S. patent application Ser. No. 15/239,686, filed Aug. 17, 2016, and entitled RELEASABLE HOLDER FOR CABLES AND CONDUIT, which claims priority to U.S. Provisional Patent Application Ser. No. 62/209,213, filed Aug. 24, 2015, and entitled RELEASABLE HOLDER FOR CABLES AND CONDUIT, the disclosure of which is incorporated herein by reference.

FIELD OF THE DISCLOSURE

This disclosure relates to a releasable cable holder. More particularly, the disclosure relates to systems and methods for attaching and securing a wire, cable, or conduit to a structure. For example, these releasable cable holders may be used inside a wall in a residential, commercial, or industrial structure, adjacent a junction box.

BACKGROUND OF THE DISCLOSURE

Junction boxes are found in residential, commercial, and industrial structures. Junction boxes provide an enclosed container for connections of wires and cables, and junction boxes often support an exposed device such as a light switch or duplex outlet. The wires and cables may be unprotected non-metallic sheathed cables (NM and NMC, also known as Romex-type cables) as often found in residential structures, or conduit-protected cables as often found in commercial and industrial structures.

Cable holders secure wires, cable, and/or conduit to an underlying structure, adjacent a junction box, or between other supports. A primitive cable holder found in many structures in the United States is a staple or bracket, encompassing a cable or wire, hammered into a stud. The staple or bracket is commonly made of steel and may be insulated. Problems include the time and effort involved, possible damage to the cable or wire, limited space to swing a hammer, and possible injury to fingers or hand.

When a large number of cables or wires need to be secured in the same area on a structure, a popular method is to nail a cable holder with multiple slots stacked in a row (commonly known as a "stacker") to the structure.

Examples of various cable holders are disclosed in U.S. Pat. Nos. 6,222,128; 6,313,406; 6,513,766; 6,655,644; 7,347,401; 7,608,782; 8,505,858; U.S. D407,963; and U.S. D663,274.

The disclosures of these and all other publications referenced herein are incorporated by reference in their entirety for all purposes.

SUMMARY OF THE DISCLOSURE

The present releasable cable holder is one that will solve the above-mentioned problems.

Many of the disclosed embodiments of a releasable cable holder are nonmetallic, but some embodiments may be metallic. The present invention provides various carefully engineered cable holders that attach to a structure without the need for tools (e.g., nails, staples, hammer) and that secure cables and wires to the underlying structure. However, at least one hole may be provided in a base plate of each holder to allow a nail or screw to be used for additional support, if needed. The releasable cable holder may be used as a pre-support for cables and wires to be mounted away from a structure.

The releasable cable holder can secure various types and sizes of cables and wires, such as, NM cables, MC cables, Cat 5 cables, and SER cables, as well as various conduits. For example, the holders may secure conduit-protected cables and wires. The releasable cable holder may be opened and closed for adding or removing cables or wires. Furthermore, the releasable cable holder may be stacked and secured on another, similar releasable cable holder, for separating and/or adding additional cables or wires.

The releasable cable holder secures cables and wires in a channel formed between a top and bottom cover. The bottom cover of the releasable cable holder may have an adhesive material on the outer surface. The adhesive material is made to attach to an underlying structure and absorb shock, stress, and strain applied to the releasable cable holder.

The top and bottom covers may have a lateral side or sides that may have 90° (degree) walls or lips. These walls or lips are shaped to latch, attach or connect the top cover to the bottom cover and to retain a cable and/or wire within the channel. In some embodiments, the top and bottom covers may have walls or lips that are greater or lesser than 90° (degrees).

A hinge attaches the top and bottom covers together on one side to facilitate the opening and closing of the releasable cable holder. In many embodiments, the hinge is a flexible hinge, molded from the same material used for the primary components of the cable holder. Such a flexible hinge may also be a living hinge, with the primary components and the living hinge molded as part of a single injection process. On an opposite side of the hinge is a latching or snapping system that secures the top and bottom cover together. In some embodiments, the releasable cable holder may have a tab or flap attached to a top cover to help unlatch and/or open the releasable cable holder.

The top and bottom covers are configured to provide sufficient pressure on cables and wires within a channel to hold the cables and wires securely. In some embodiments, the channel may contain padding material for holding the cables and wires in place. In some embodiments, the channel may have impediments or projections for securing the cables and wires in place.

Some embodiments of the releasable cable holder may have a top cover that attaches to a bottom cover in the center and latches separately on each side forming two separate channels.

Some embodiments of the releasable cable holder may include the ability to secure the releasable cable holder to the underlying structure with additional support, such as screws, nails, or staples.

Advantages of the present disclosure will be more readily understood after considering the drawings and the Detailed Description.

BRIEF DESCRIPTION OF THE DRAWINGS

FIG. 25 is an end view of the releasable cable holder shown in FIGS. 16-24, but with the holder shown in a fully opened position.

FIG. 26 is a top view of the releasable cable holder shown in FIG. 25.

FIG. 38 is an end view of the releasable cable holder shown in FIG. 37.

Figure 1:
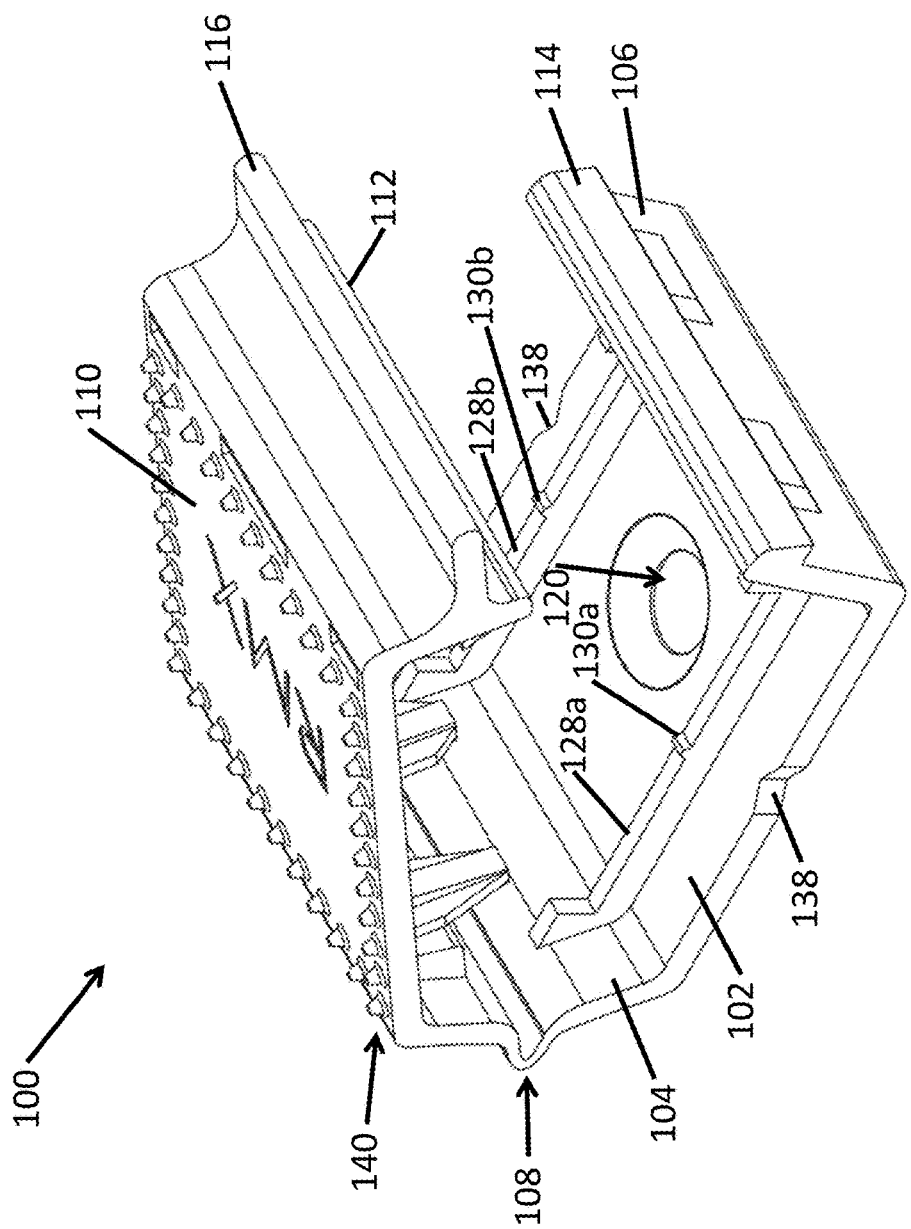
FIG. 1 is an isometric view of a releasable cable holder in accordance with the principles of the present invention, shown in an unlatched position.
Figure 2:
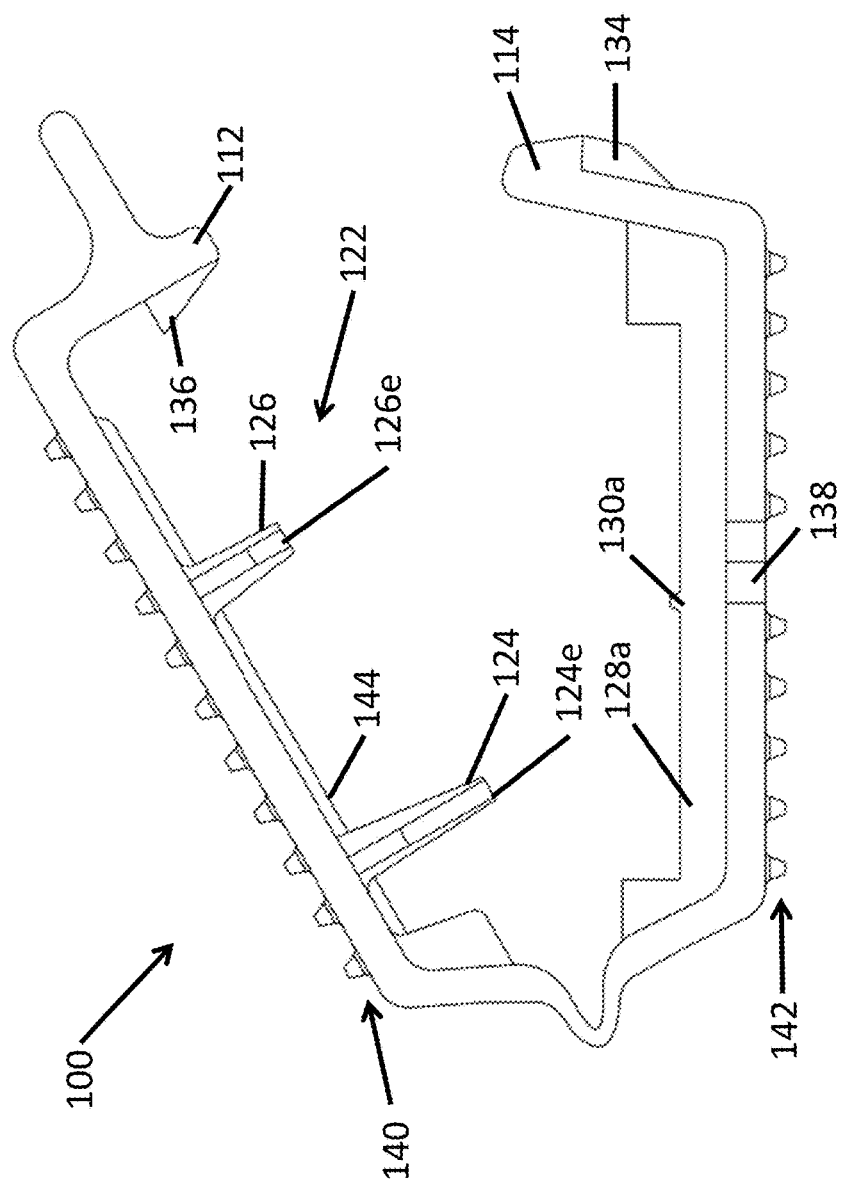
FIG. 2 is an end view of the releasable cable holder shown in FIG. 1.
Figure 3:
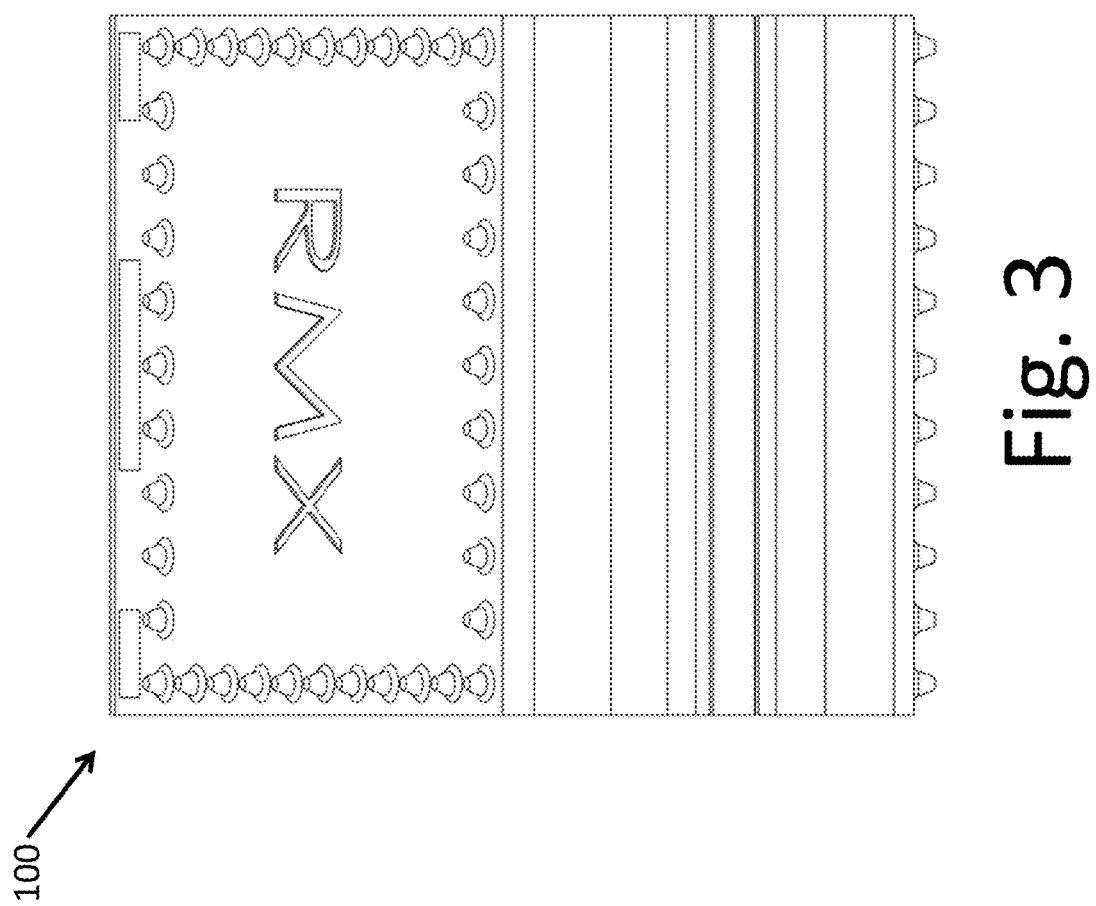
FIG. 3 is a left side view of the releasable cable holder shown in FIGS. 1 and 2.
Figure 4:
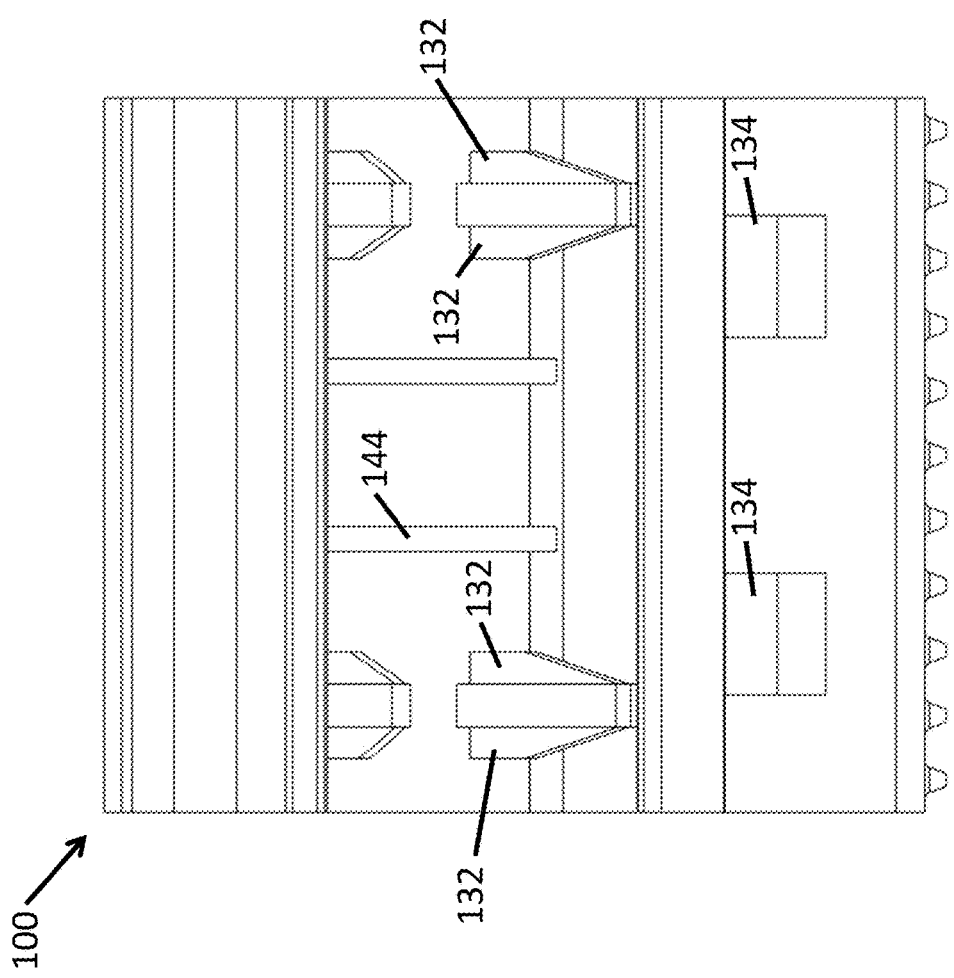
FIG. 4 is a right side view of the releasable cable holder shown in FIGS. 1-3.
Figure 5:
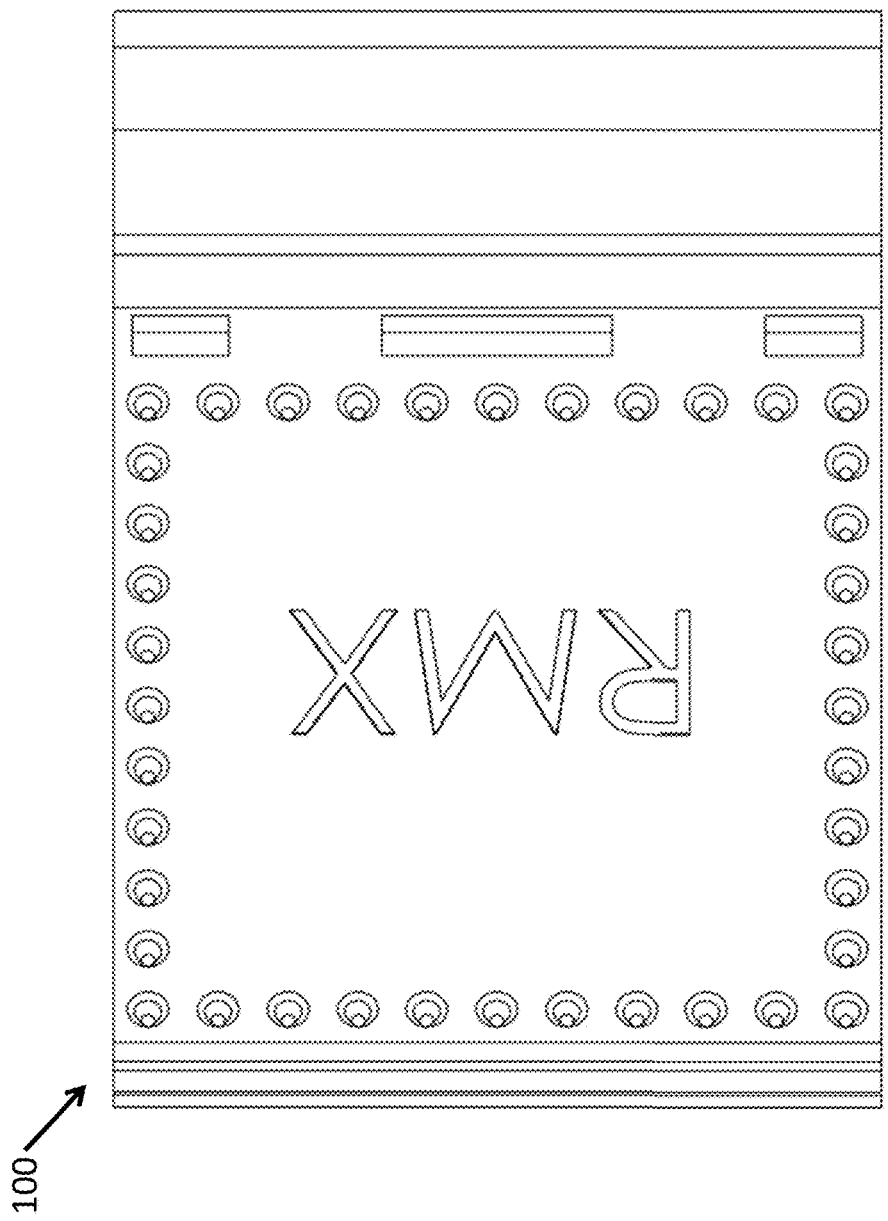
FIG. 5 is a top view of the releasable cable holder shown in FIGS. 1-4.
Figure 6:
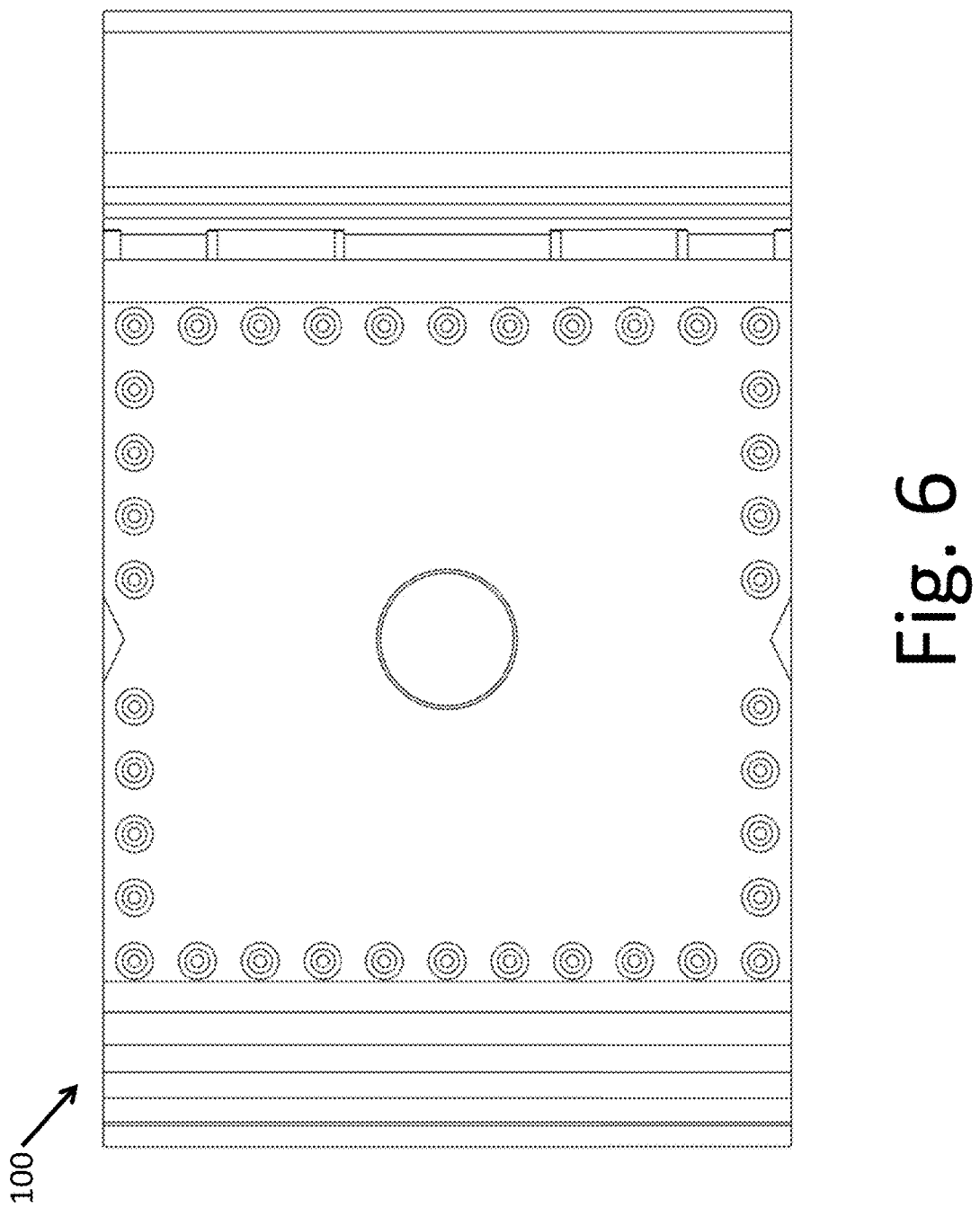
FIG. 6 is a bottom view of the releasable cable holder shown in FIGS. 1-5.

The drawings illustrate embodiments and schematic concepts for RELEASABLE HOLDER FOR CABLES AND CONDUIT according to the invention. The purpose of these drawing is to aid in explaining the principles of the invention. Thus, the drawings should not be considered as limiting the scope of the invention to the embodiments and schematic concepts shown therein. Other embodiments of RELEASABLE HOLDER FOR CABLES AND CONDUIT may be created which follow the principles of the invention as taught herein, and these other embodiments are intended to be included within the scope of patent protection.

DETAILED DESCRIPTION OF THE DISCLOSURE

Examples of releasable cable holders are shown in FIGS. 1-38. Unless otherwise specified, a releasable cable holder may, but is not required to contain at least one of the structure, components, functionality, and/or variations described, illustrated, and/or incorporated herein.

The drawings show several different embodiments, with each embodiment intended for use with a particular type of wire, cable, or conduit. For example, one embodiment is shown that is intended primarily for use with Romex cable, traditionally used in sizes known as 14-2, 12-2, and 10-2, as well as 14-3, 12-3, and 10-3. Another embodiment is shown that is intended primarily for use with a range wire, traditionally used in sizes known as 8-3, and 6-3. Yet another embodiment is shown that is intended primarily for use with PEX plumbing pipes, which are not cables, but are similar in size and shape. Still another embodiment is shown that is intended primarily for use with MCC (metal-clad conduit, or metal-clad cable), which enclose cables, and are therefore similar in size and shape. However, given the creative and innovative designs of the holders, many combinations and choices of cables, wires, pipes, and conduit may be releasably held by the different embodiments.

Turning first to the embodiment shown in FIGS. 1-15, sized and designed for use with one or two Romex cables, a releasable cable holder 100 includes a planar base plate 102, with generally parallel sidewalls extending upward from base plate 102. One of the sidewalls is identified at 104, and another of the sidewalls is identified at 106. A hinge 108 is formed along one of the sidewalls 104, movably connecting a top cover 110 to the one of the sidewalls 104.

A releasable latch is formed from a latching lip 112 formed on top cover 110, distal from hinge 108, which latches with a corresponding lip 114 formed on another of the sidewalls 106, distal from hinge 108. Holder 100 is shown in an unlatched position in FIGS. 1-6, and in a latched position in FIGS. 7-15. Opening holder 100 from the latched position is made easier by a release tab 116 extending out from top cover 110 adjacent latching lip 112.

Figure 12:
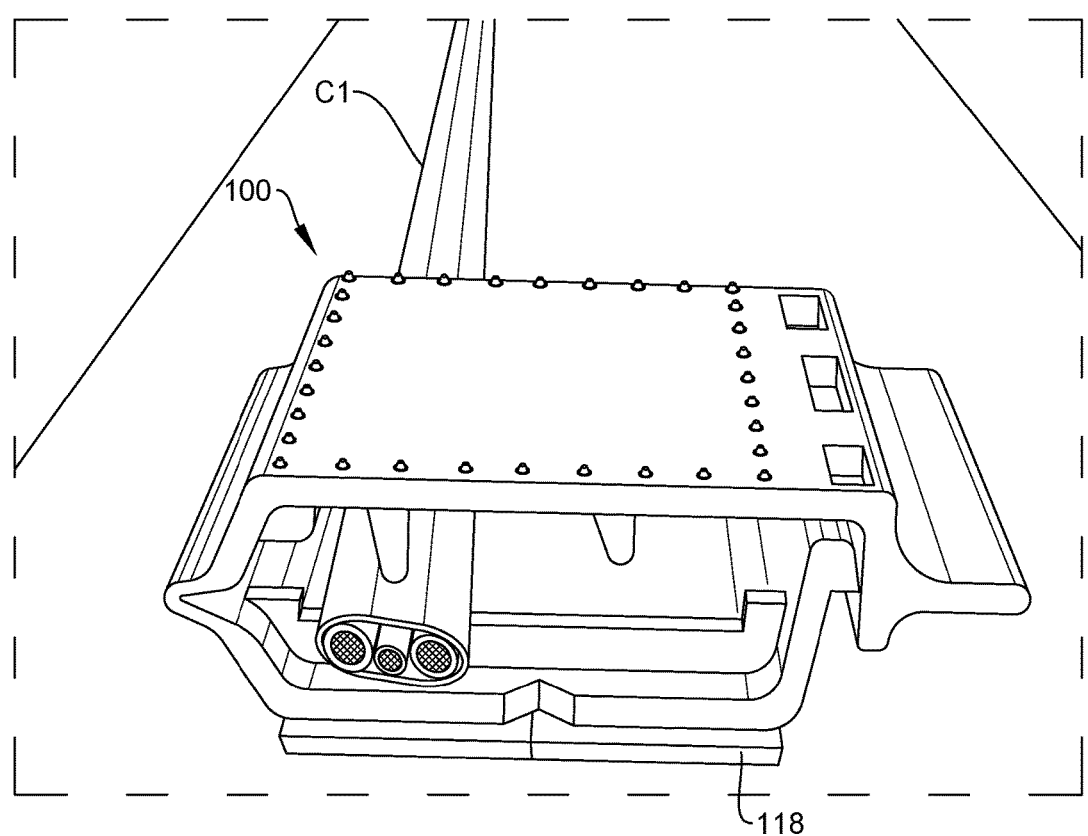
FIG. 12 is an end perspective view of the releasable cable holder shown in FIG. 8, with a cable gripped by the holder.
Figure 13:
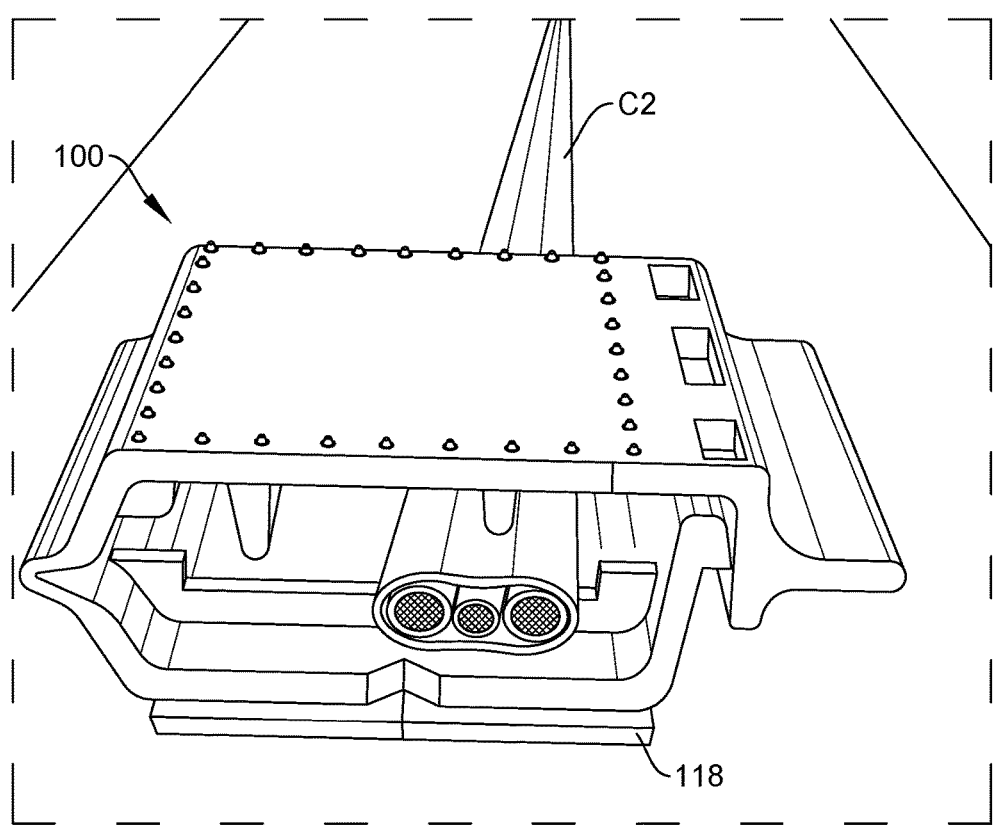
FIG. 13 is an end perspective view of the releasable cable holder shown in FIG. 12, with a different cable gripped by the holder.
Figure 14:
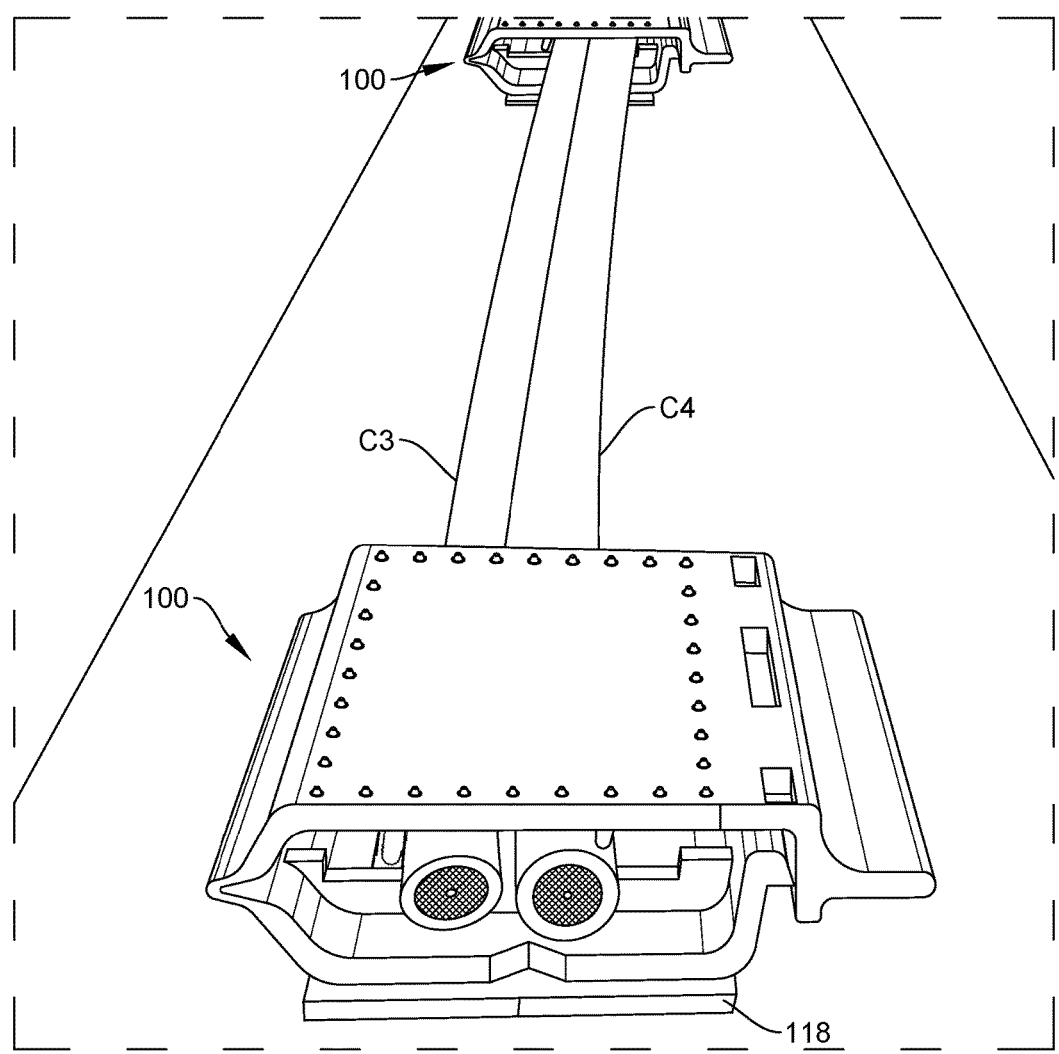
FIG. 14 is an end perspective view of the releasable cable holder shown in FIGS. 12 and 13, with two coax cables gripped by the holder.
Figure 15:
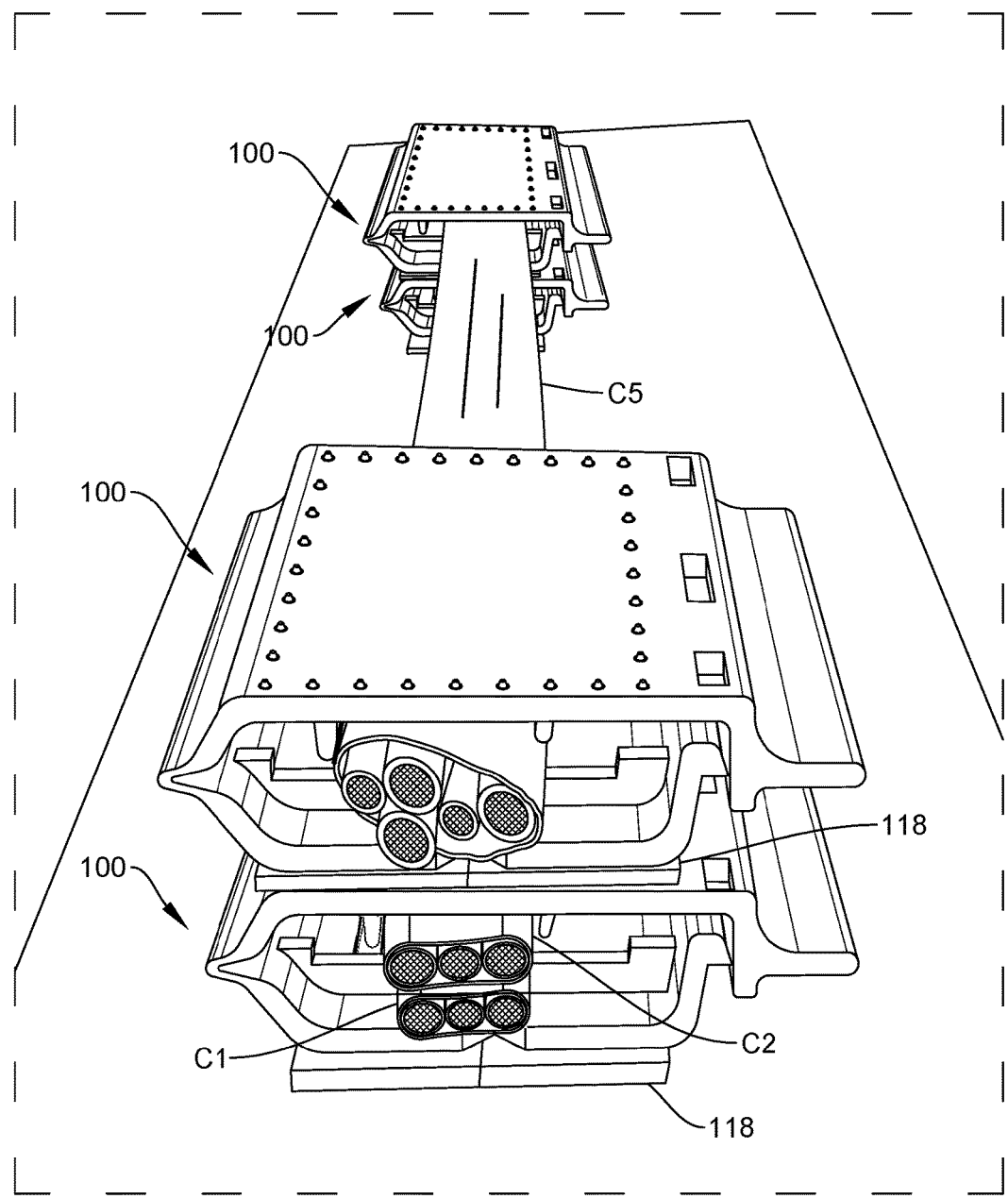
FIG. 15 is an end perspective view of the releasable cable holder shown in FIGS. 12 and 13, with the cables of FIGS. 12 and 13 both gripped by the holder, and a second holder adhered to the first holder with an additional cable gripped by the second holder.
Figure 16:
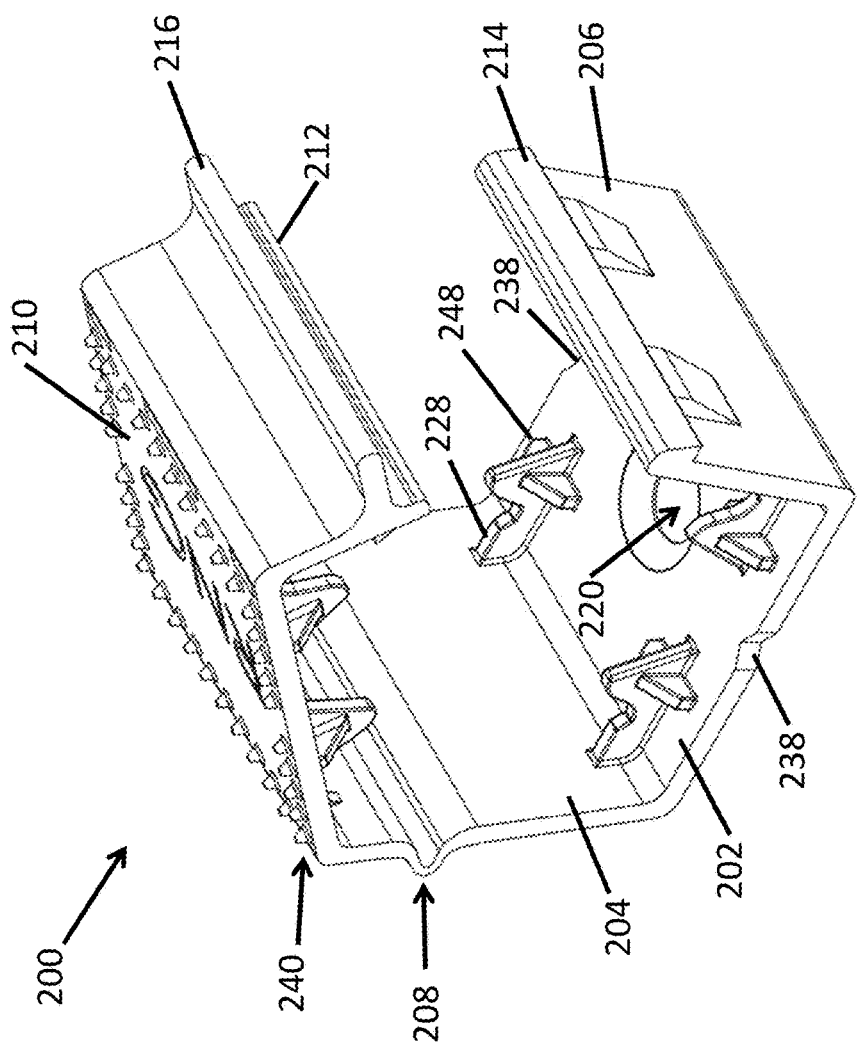
FIG. 16 is an isometric view of a second embodiment of a releasable cable holder in accordance with the principles of the present invention, shown in an unlatched position.
Figure 17:
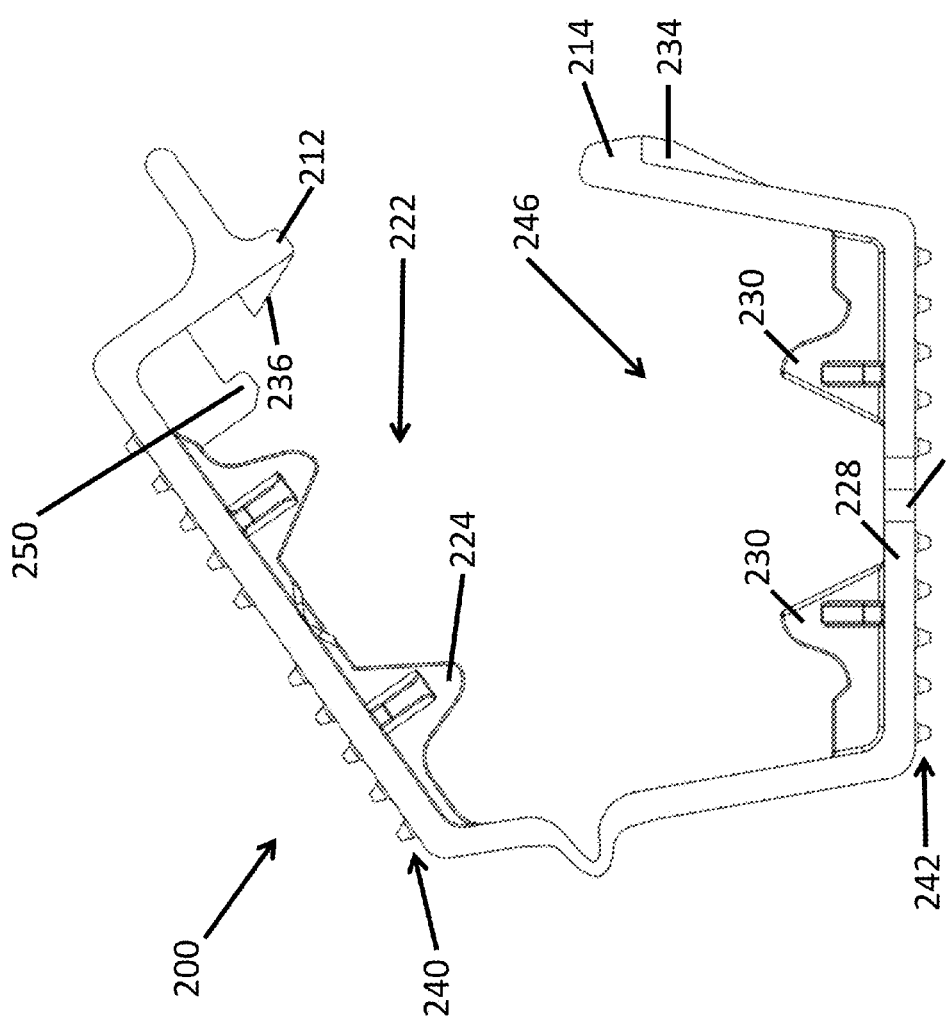
FIG. 17 is an end view of the releasable cable holder shown in FIG. 16.
Figure 18:
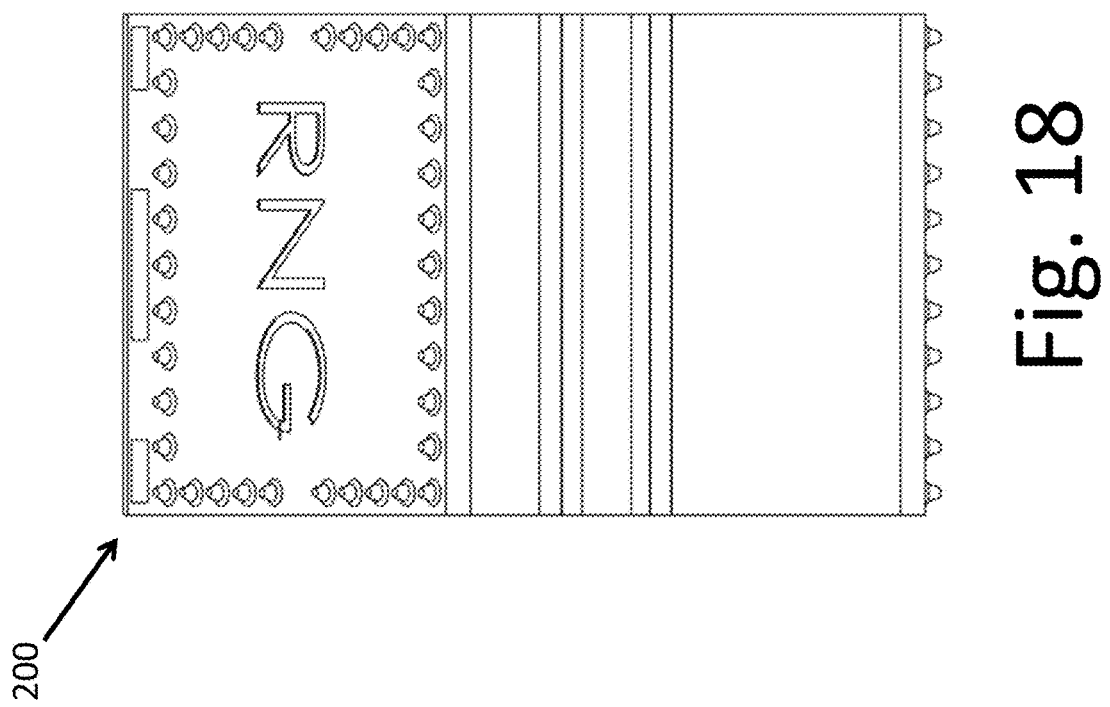
FIG. 18 is a left side view of the releasable cable holder shown in FIGS. 16 and 17.
Figure 19:
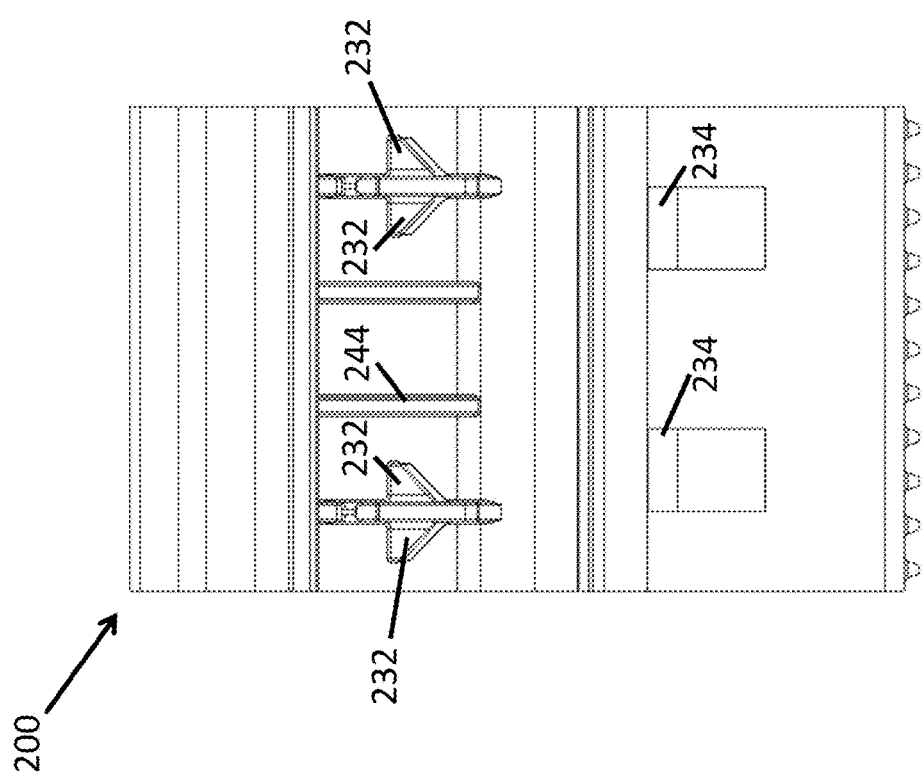
FIG. 19 is a right side view of the releasable cable holder shown in FIGS. 16-18.
Figure 20:
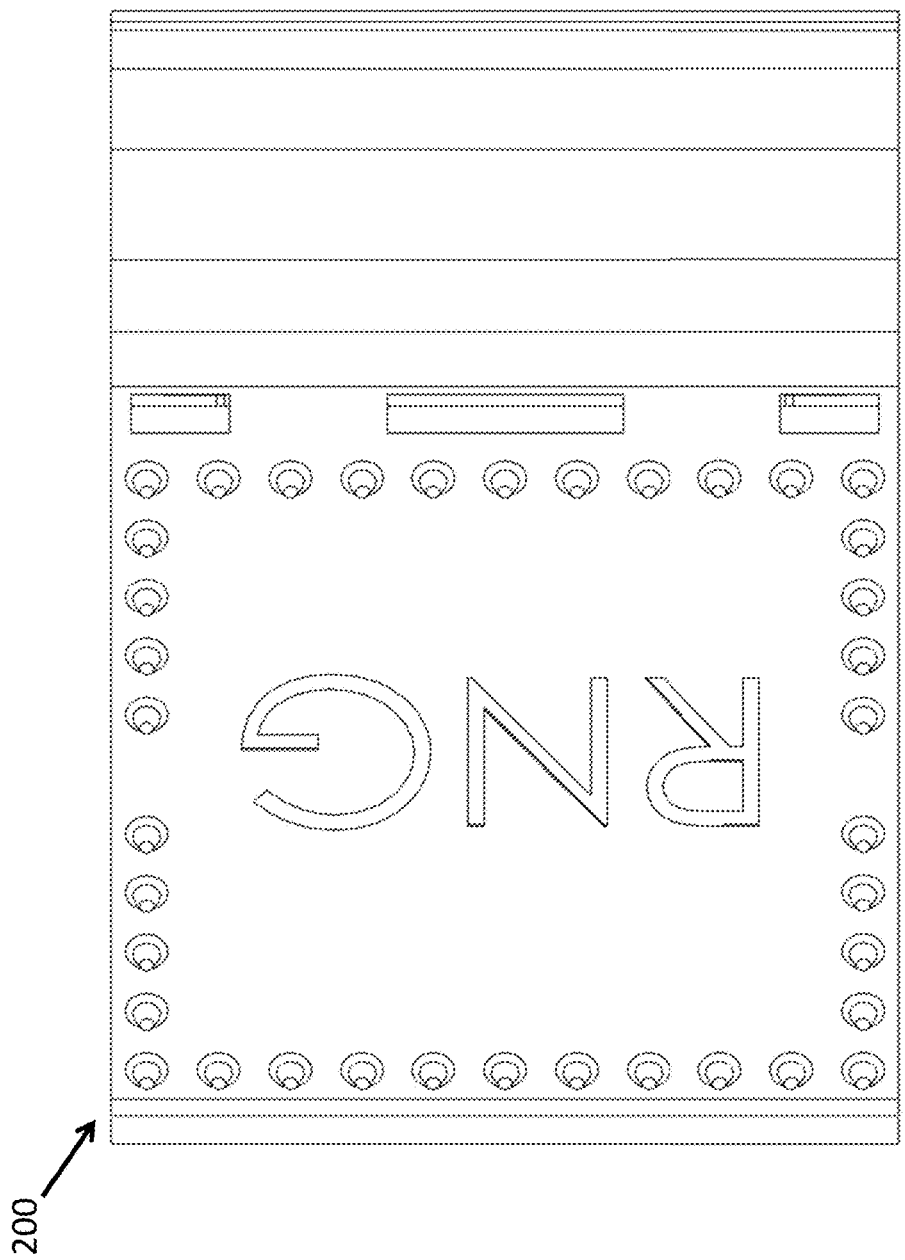
FIG. 20 is a top view of the releasable cable holder shown in FIGS. 16-19.
Figure 21:
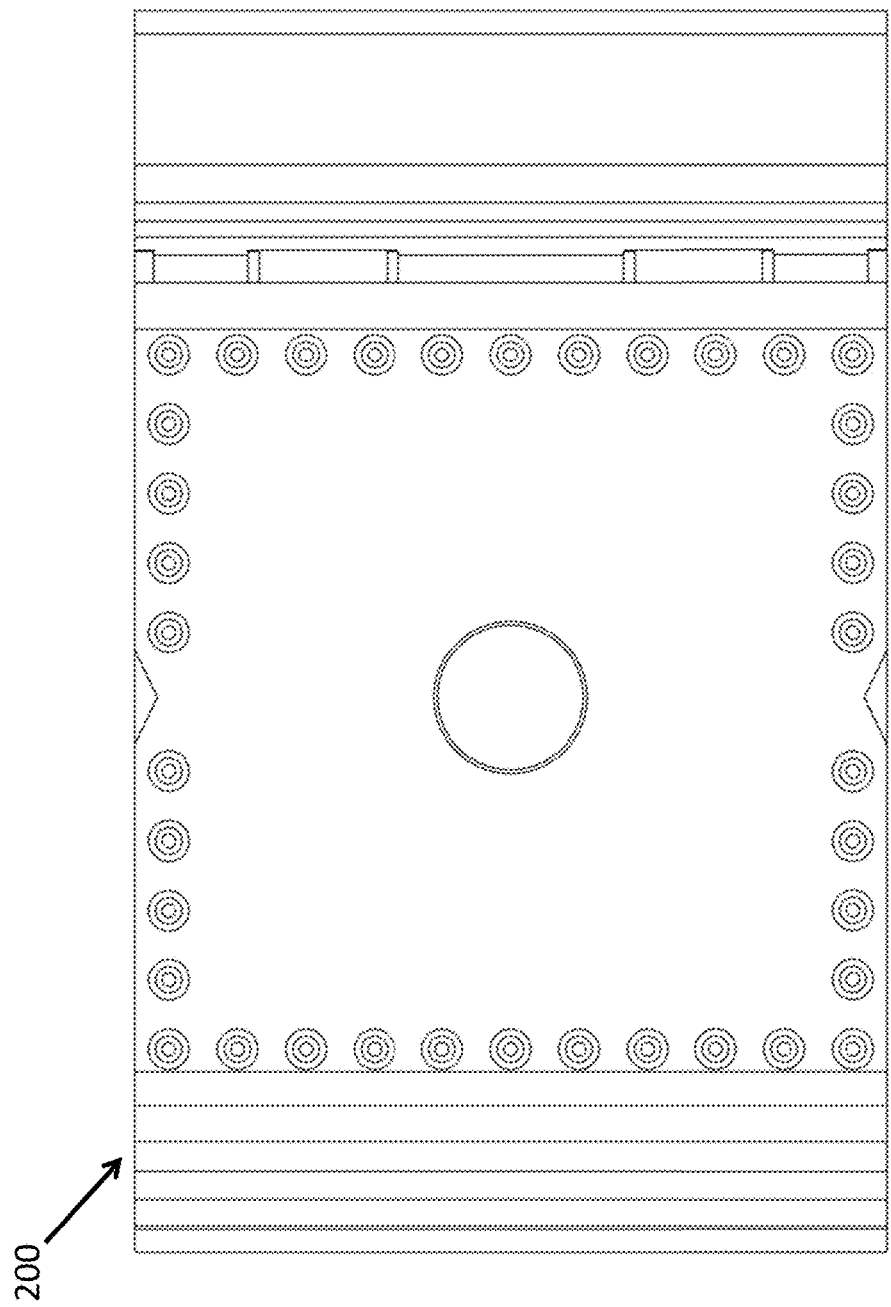
FIG. 21 is a bottom view of the releasable cable holder shown in FIGS. 16-20.

FIG. 12 shows a cable C1 being held by a holder 100, with holder 100 in the latched position. Cable C1 is an example of 14-2 Romex with ground. There may be situations where it is desired to move or remove cable C1, which requires opening holder 100 to the unlatched position. To do this, a user pulls up on release tab 116 (see straight arrow in FIG. 8), away from base plate 102, so that latching lip 112 is levered away from corresponding lip 114 (see curved arrow in FIG. 8), and top cover 110 is moved about hinge 108. A user may then relocate or remove any cable or wire that may be held by holder 100, or replace cable C1 with a different cable C2 as shown in FIG. 13, or grip two other cables C3 and C4 as shown in FIG. 14, or grip both cable C1 and C2, as shown in FIG. 15. Cable C2 is an example of 12-2 Romex with ground.

Also visible in FIGS. 12-15 is an adhesive face 118 attached to base plate 102, opposite from top cover 110. As shown, adhesive face 118 may be used to attach base plate 102 to an underlying structure, S. Adhesive face 118 may be a double-sided foam tape, or other types of double-sided adhesive tapes, or various types of pressure-sensitive glues or adhesives. In the case of double-sided foam tape, one side of adhesive is attached firmly to base plate 102. A protective sheet (not shown) may prevent another side of the tape from being exposed until needed, as is known in the art of double-sided tapes.

A hole 120 is formed in base 102. Hole 120 may receive a fastener, such as a screw, nail, or rivet, to additionally connect base 102 to the underlying structure. In a finished installation, it is intended that holder 100 be firmly anchored to the underlying structure, and that holder 100 firmly grips any cable held in holder 100.

Gripping power for holder 100 is provided by a top set of impediments 122 jutting out from top cover 110, and generally facing base plate 102. In the embodiment shown in FIGS. 1-15, top set of impediments 122 includes a long impediment 124, and a short impediment 126. This embodiment, as shown best in FIG. 1, also includes a first base ridge 128a jutting out from base plate 102, and generally facing top cover 110, and a second base ridge 128b jutting out from base plate 102, first base ridge 128a and second base ridge 128b reinforcing the sidewalls 104, 106 relative to the base plate 102, and generally facing top cover 110. Base ridge 128a provides a relatively flat receiving surface, which has been found to be particularly convenient when working with flat cables such as Romex.

An advantage of providing both long impediment 124, and short impediment 126, and arranging these impediments so that one impediment is closer to hinge 108, and another impediment is farther from hinge 108, is that holder 100 may safely grip either a smaller cable such as 14-2 Romex, or a larger cable such as 10-3 Romex. A distal end 124e of long impediment 124 is shaped to allow for firm securement without piercing any covering sheath of a wire or cable being secured.

The different length impediments 124 and 126 gives this embodiment RMX more versatility and holds various cables effectively. The distal end 124e is closer to base ridge 128a, relative to a distal end 126e of short impediment 126, when top cover 110 is closed relative to base plate 102. As a result, a smaller cable may be gripped securely by long impediment 124 pressing the cable against base ridge 128a, as shown in FIG. 12, while more space is available to accommodate a larger cable between short impediment 126 and base ridge 128a, as shown in FIG. 13.

Even more options for gripping different cables may be provided, as shown best in FIG. 1, by including a central impediment 130a jutting out from base ridge 128a and away from base plate 102. For example, as shown in FIG. 14, two coax cables C3, C4 may be gripped simultaneously. Other examples are shown in FIG. 15, with cables C1 and cable C2 gripped simultaneously, stacked on top of each other. Also shown in FIG. 15 is another holder 100, gripping a cable C5. Cable C5 is an example of 10-3 Romex with ground.

In general, a cable placed on base plate 102 between sidewalls 104 and 106 is gripped between base ridge 128a and at least one of the impediments 122 when top cover 110 is closed relative to base plate 102. Should there be any forces along a cable, as may happen when someone tugs or pulls on the cable, it has been found helpful if impediments 122 are reinforced against bending. This reinforcement is provided by a longitudinal buttress 132. Preferably, there are opposing buttresses, as shown and labeled.

It also has been found that it is helpful to limit sliding of top cover 110 relative to base plate 102. A sidewall abutment 134 is formed on another of the sidewalls 106, and a corresponding abutment 136 is formed on top cover 110, adjacent latching lip 112. A similar, but mirrored, set of abutments is formed as well, so that sliding movement of top cover 110 is limited in two opposing directions.

Holder 100 is best installed in most situations, centered relative to a building stud, so that cables held by holder 100 are isolated from drywall defining occupied spaces, as required by local building codes. To help with this centering, a pair of opposing visual indicators 138 is formed in base plate 102, defining an approximate centerline CL of cable holder 100, extending generally parallel to sidewalls 104 and 106. Visual indicators 138 are notches, which many users might be able to feel, so that the indicators are also tactile indicators which may be of particular usefulness given that holder 100 typically is installed by hand.

The planar nature of base plate 102 and top cover 110 allows multiple cables to be held by gripping some in a first holder, and then adhering a second similar holder with the second base plate adhered to top cover 110. Proper placement and adhesion of a second holder to holder 100 is improved by forming a set of nubbins 140 on top cover 110. As shown, nubbins 140 define an outer perimeter extending around top cover 110, distal from base plate 102. More specifically, the outer perimeter defined by nubbins 140 is sized to be larger than adhesive face 118. A second set of nubbins 142 are formed on base plate 102. Nubbins 142 are arranged in a similar pattern to nubbins 140, with nubbins 142 defining an outer perimeter extending around base plate 102, distal from top cover 110. The outer perimeter defined by nubbins 142 is sized to be larger than adhesive face 118.

Figure 11:
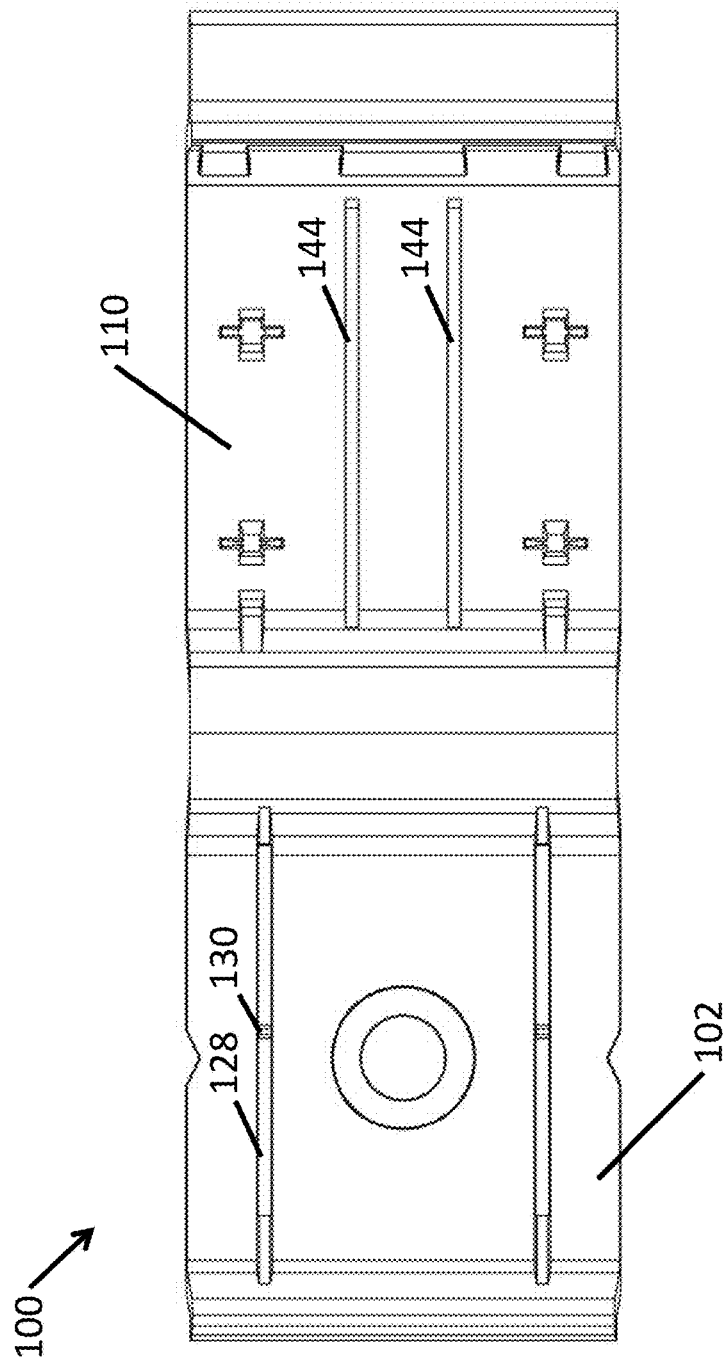
FIG. 11 is a top view of the releasable cable holder shown in FIGS. 1-10, but with the holder shown in a fully opened position.

FIG. 11 shows holder 100, splayed open 180-degrees so that base plate 102 and top cover 110 are approximately parallel. Top cover 110 may be reinforced with an integrally molded beam 144.

A second embodiment of a holder 200 is shown in FIGS. 16-26. Similar features are labelled with reference numbers that are similar to those described above, but beginning with the numeral "2", such as a base plate 202 and a top cover 210. A base set of impediments 246 are formed on base plate 202, jutting out from base plate 202 and generally facing top cover 210. A top set of impediments 222 is formed in top cover 210, jutting out from top cover 210 and generally facing base plate 202. By forming opposing impediments, with some impediments 222 formed on top cover 210, and other impediments 246 formed on base plate 202, a cable placed on base plate 202 between sidewalls 204, 206, is gripped by at least some of impediments 222, 246, when top cover 210 is closed relative to base plate 202. A base ridge 228 and one or more longitudinal buttress 248 may be included as part of each impediment in the set of impediments 246.

Holder 200 is intended for use with larger, somewhat round cables, such as range wire. It has been found that better installations use a holder 200 that grips range wires more tightly than holder 100 might grip a Romex cable. A tighter grip makes a latching lip 212 more likely to pop loose from a corresponding lip 214. A stronger latch is provided by forming an intruding wall 250 extending inward from top cover 210, toward base plate 202. Intruding wall 250 limits movement of another of the sidewalls 206 when top cover 210 is closed relative to base plate 202. As shown best in FIG. 23, intruding wall 250 thereby limits any unintended unlatch of latching lip 212 from corresponding lip 214.

FIGS. 25 and 26 show holder 200, splayed open 180-degrees so that base plate 202 and top cover 210 are approximately parallel. Top cover 210 may be reinforced with an integrally molded beam 244. As seen best in FIG. 26, two separate intruding walls 250 may be provided.

A third embodiment of a holder 300 is shown in FIGS. 27-30. Similar features are labelled with reference numbers that are similar to those described above, but beginning with the numeral "3", such as a base plate 302 and a top cover 310. Holder 300 includes a top set of impediments 322, and a base set of impediments 346. Holder 300 is intended for use with MCC. One noticeable difference between holder 200 and holder 300 is that at least some of impediments 322 and 346 are frustoconical in shape.

A fourth embodiment of a holder 400 is shown in FIGS. 31-38. Similar features are labelled with reference numbers that are similar to those described above, but beginning with the numeral "4", such as a base plate 402 and a top cover 410. Holder 400 includes a top set of impediments 422, and a base set of impediments 444. Holder 400 is intended for use with PEX.

Figure 7:
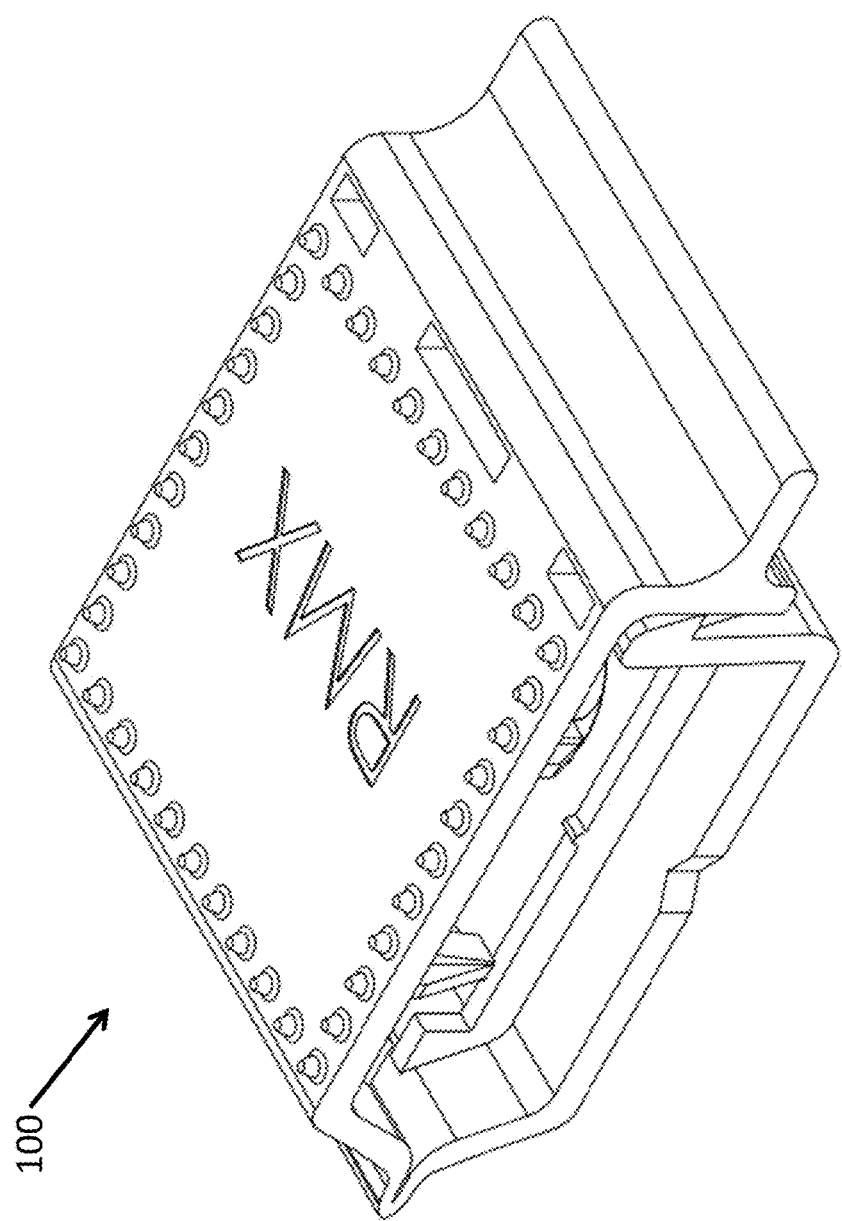
FIG. 7 is an isometric view of the releasable cable holder shown in FIGS. 1-6, but with the holder shown in a closed latched position.
Figure 22:
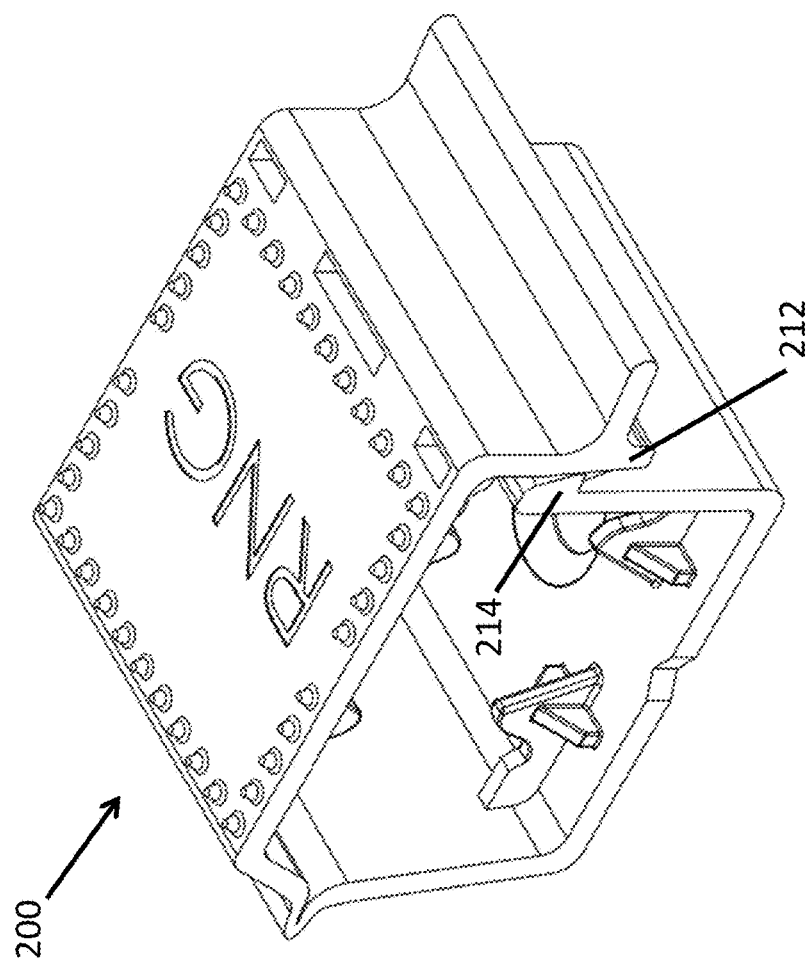
FIG. 22 is an isometric view of the releasable cable holder shown in FIGS. 16-21, but with the holder shown in a closed latched position.
Figure 30:
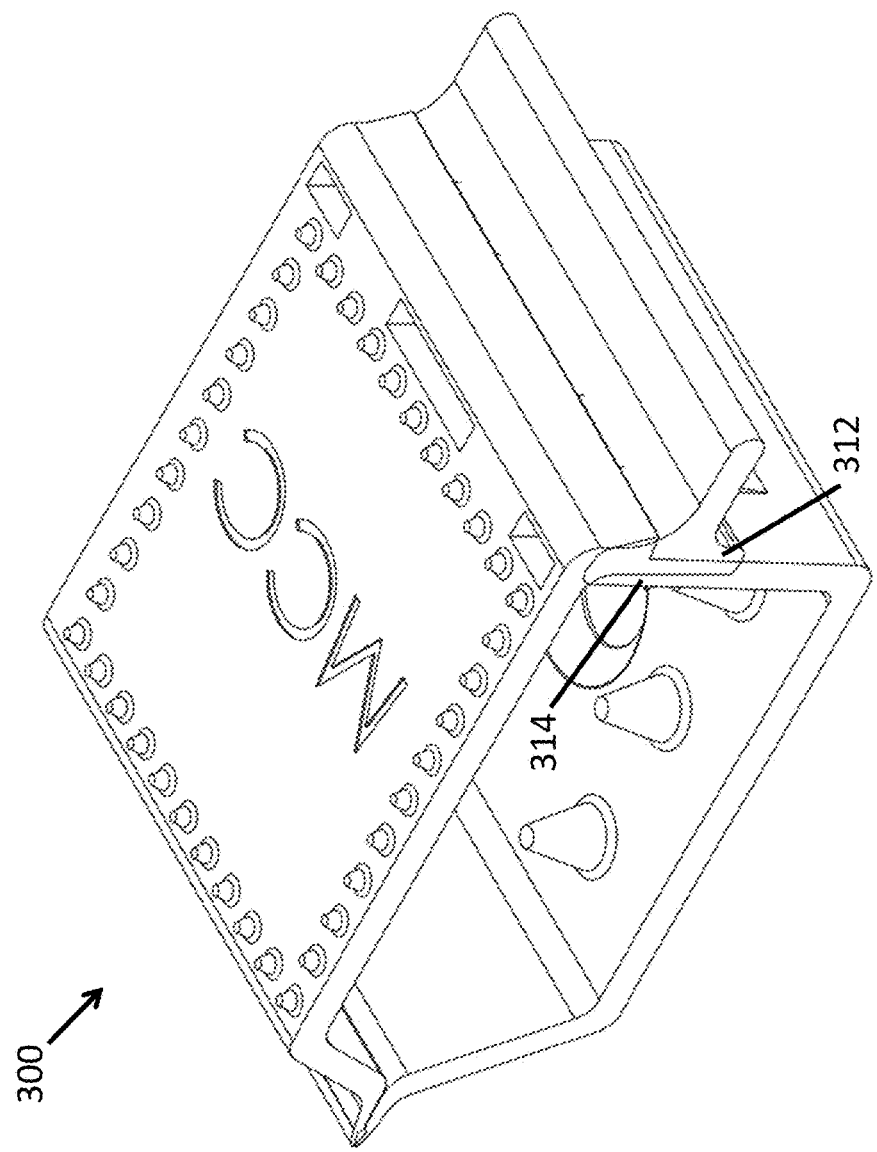
FIG. 30 is an isometric view of the releasable cable holder shown in FIGS. 27-29, but with the holder shown in a closed latched position.
Figure 31:
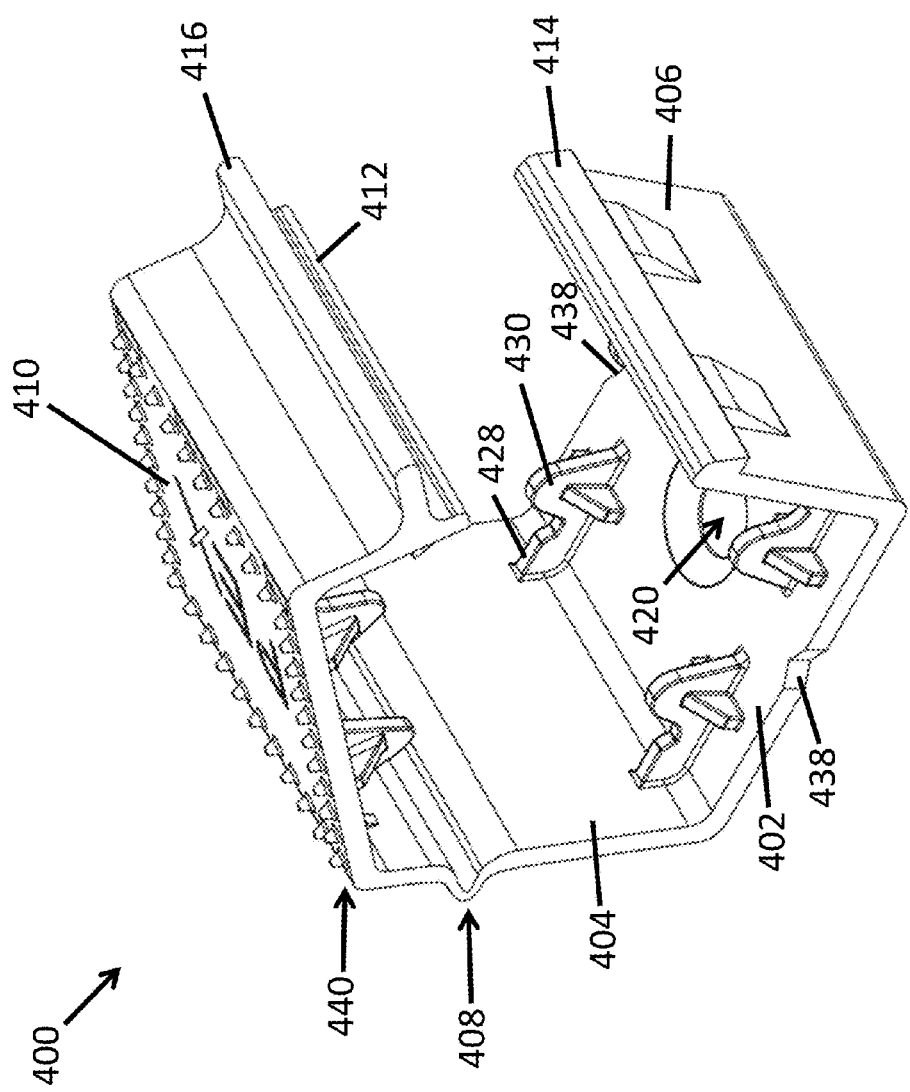
FIG. 31 is an isometric view of a fourth embodiment of a releasable cable holder in accordance with the principles of the present invention, shown in an unlatched position.
Figure 32:
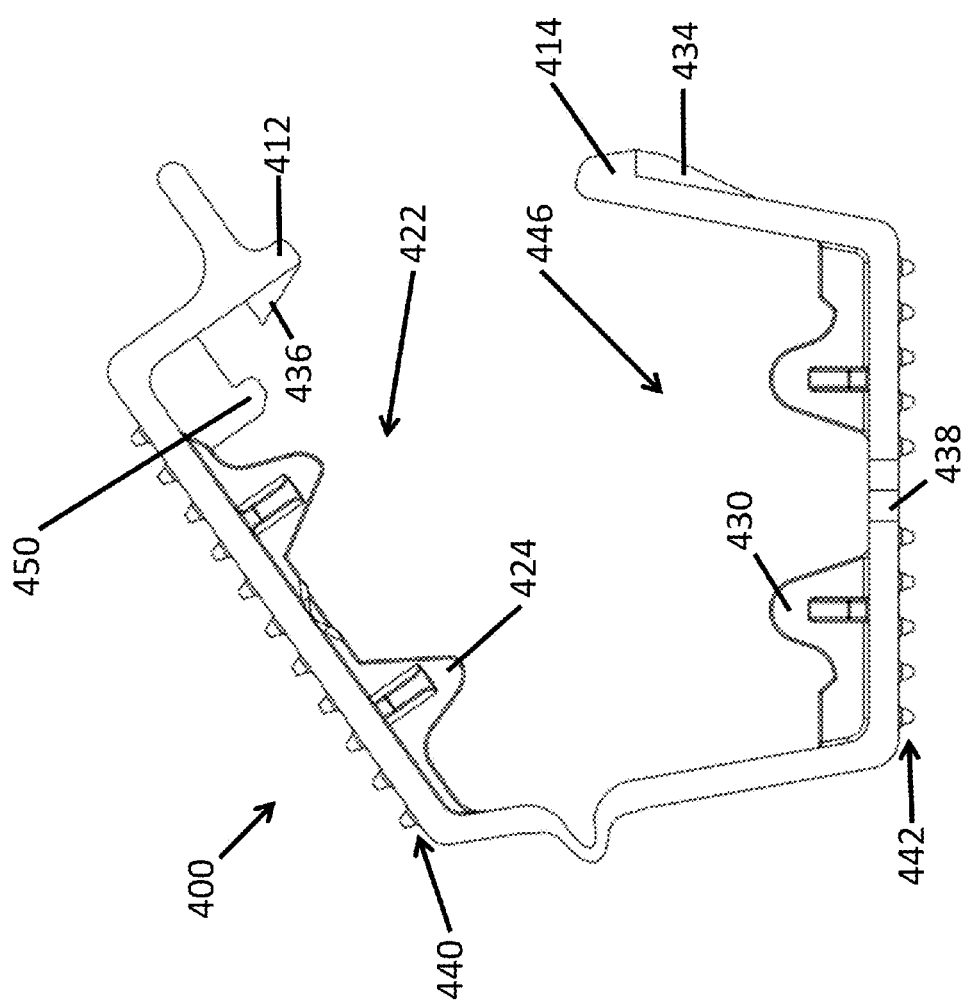
FIG. 32 is an end view of the releasable cable holder shown in FIG. 31.
Figure 33:
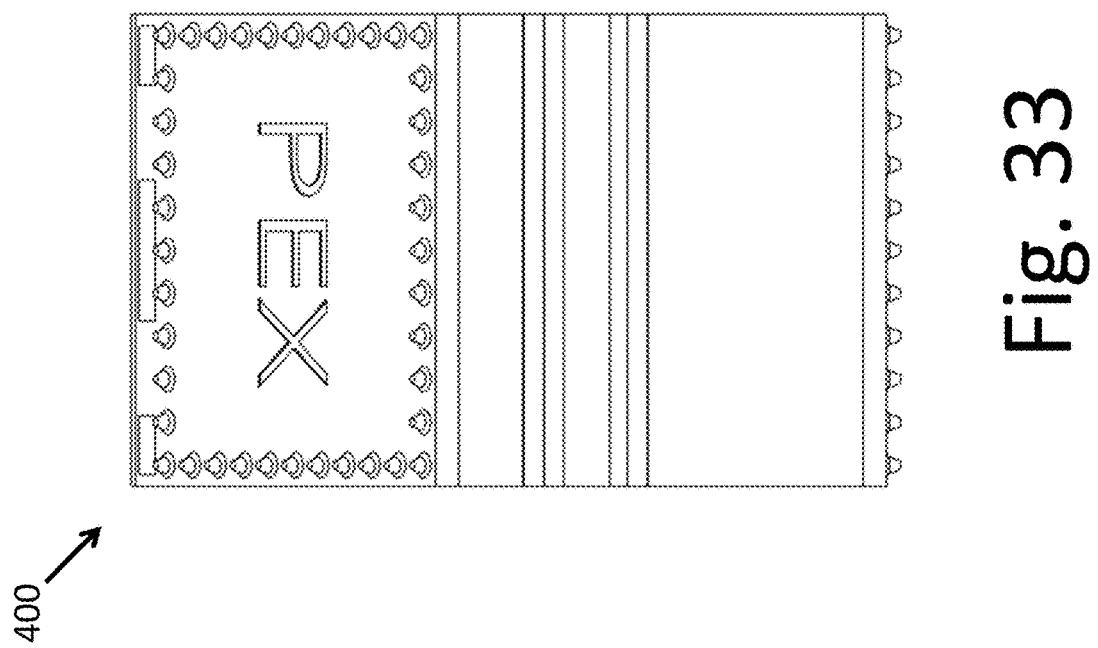
FIG. 33 is a left side view of the releasable cable holder shown in FIGS. 31 and 32.
Figure 34:
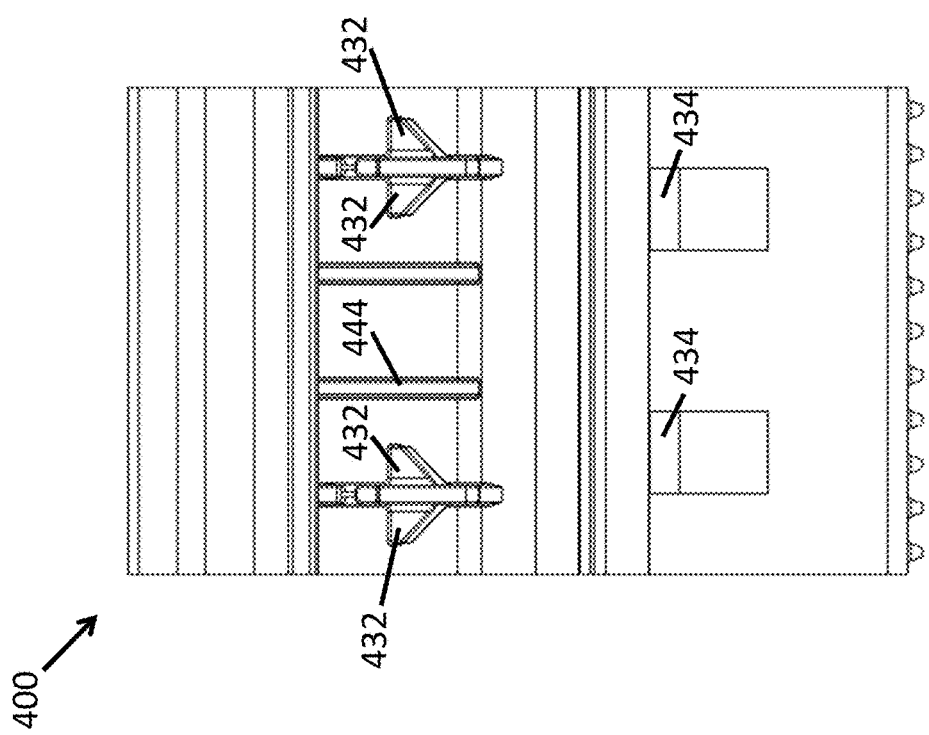
FIG. 34 is a right side view of the releasable cable holder shown in FIGS. 31-33.
Figure 35:
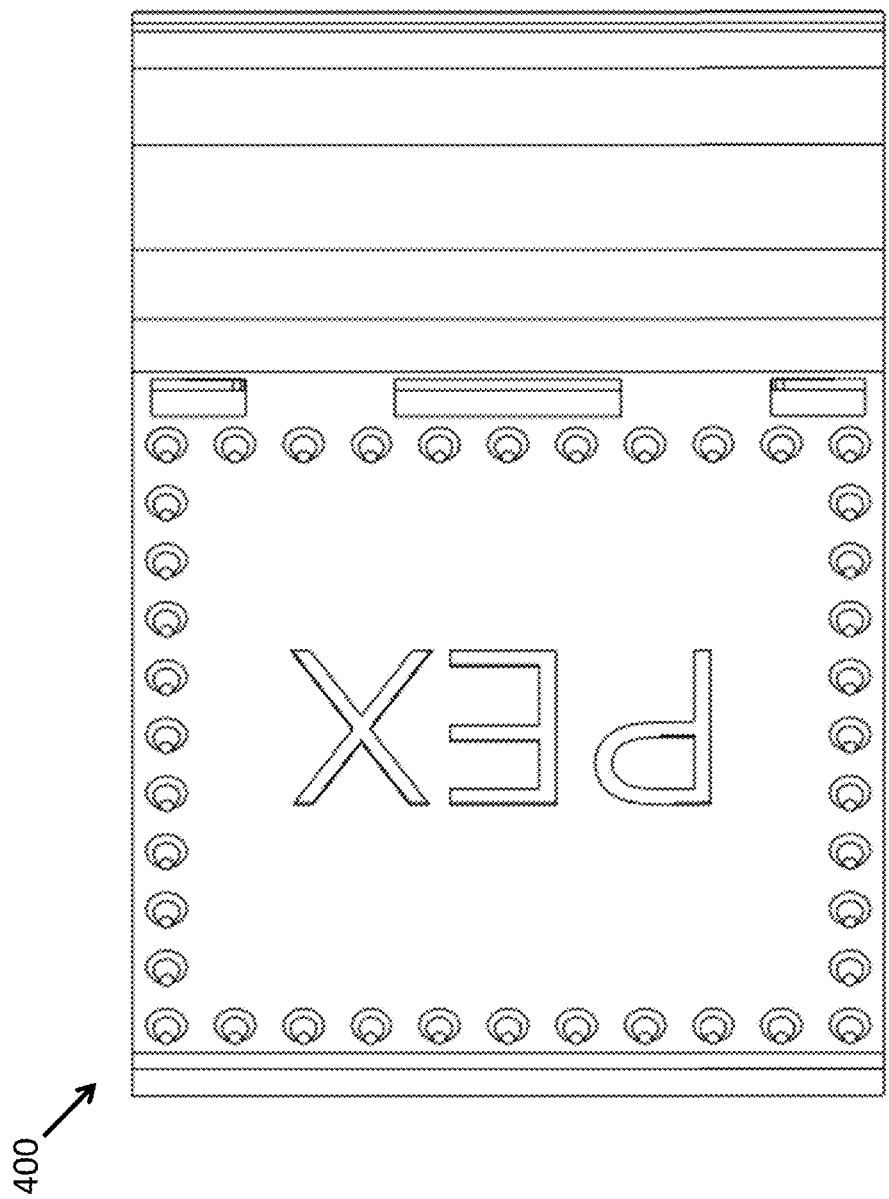
FIG. 35 is a top view of the releasable cable holder shown in FIGS. 31-34.
Figure 36:
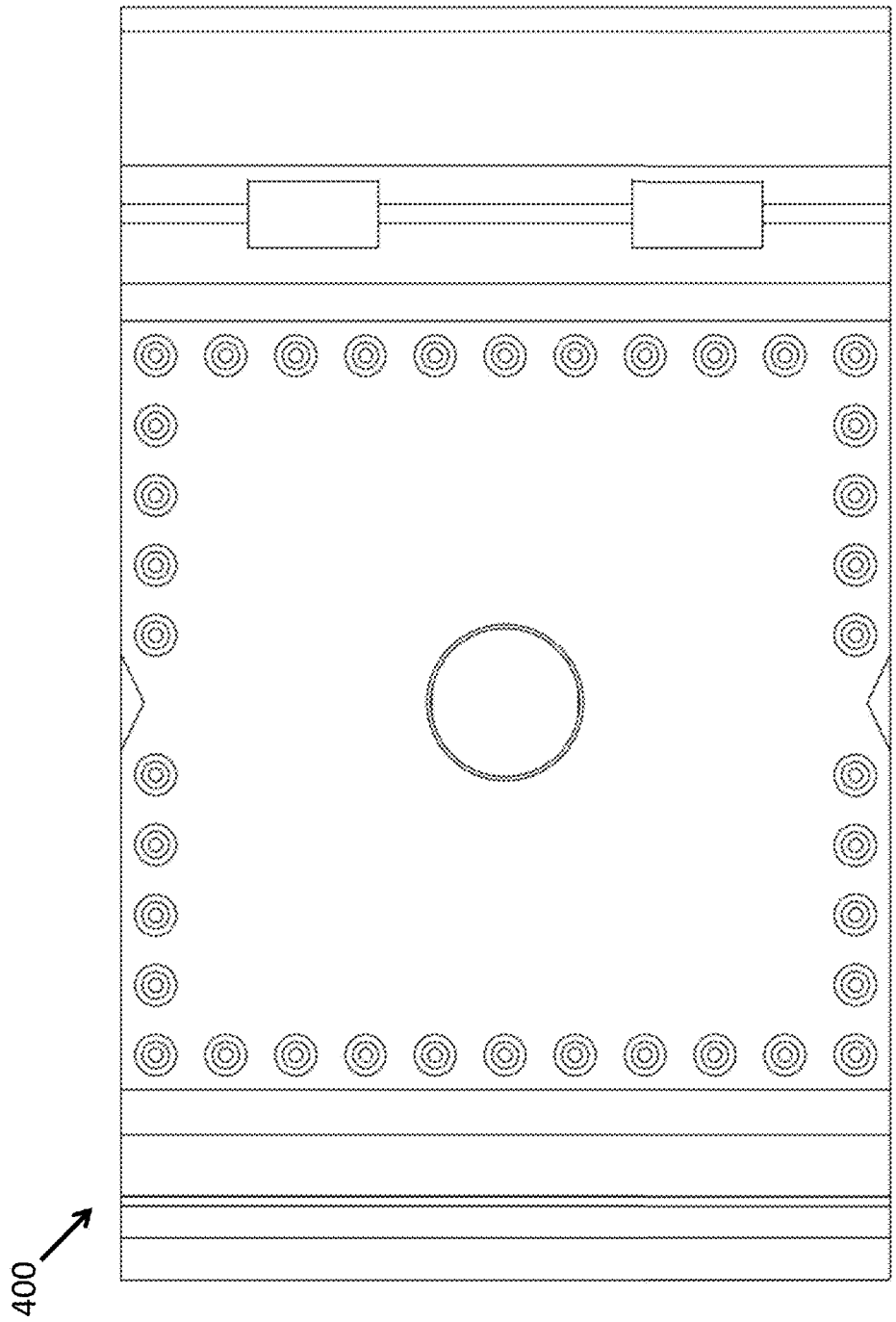
FIG. 36 is a bottom view of the releasable cable holder shown in FIGS. 31-35.

FIG. 30 shows overlapping lines, representing an unflexed, but inaccurate, position of latching lip 312 and corresponding lip 314. The overlap depicts the spring-like forces created between latching lip 312 and corresponding lip 314, resulting in a firm, secure latching mechanism. A more accurate representation of the third embodiment of FIG. 30 would look somewhat like what is shown in FIGS. 7 and 22.

Figure 8:
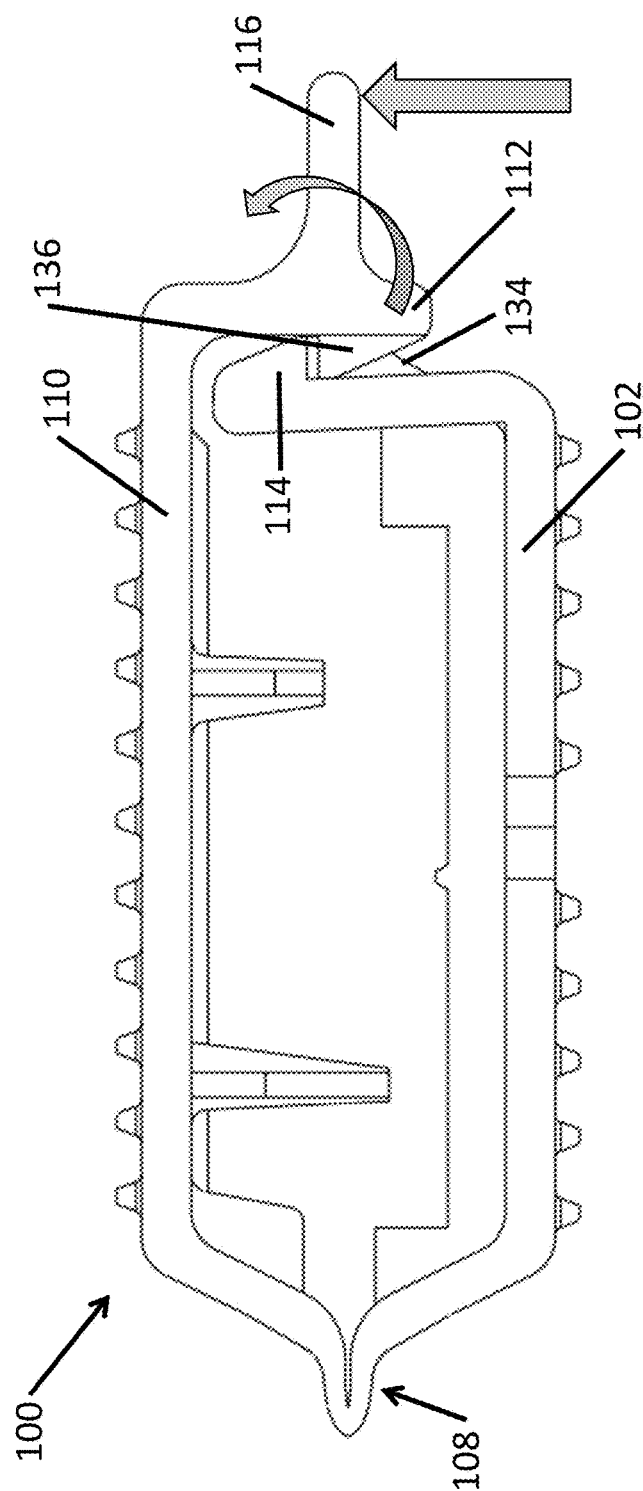
FIG. 8 is an end view of the releasable cable holder shown in FIG. 7.
Figure 9:
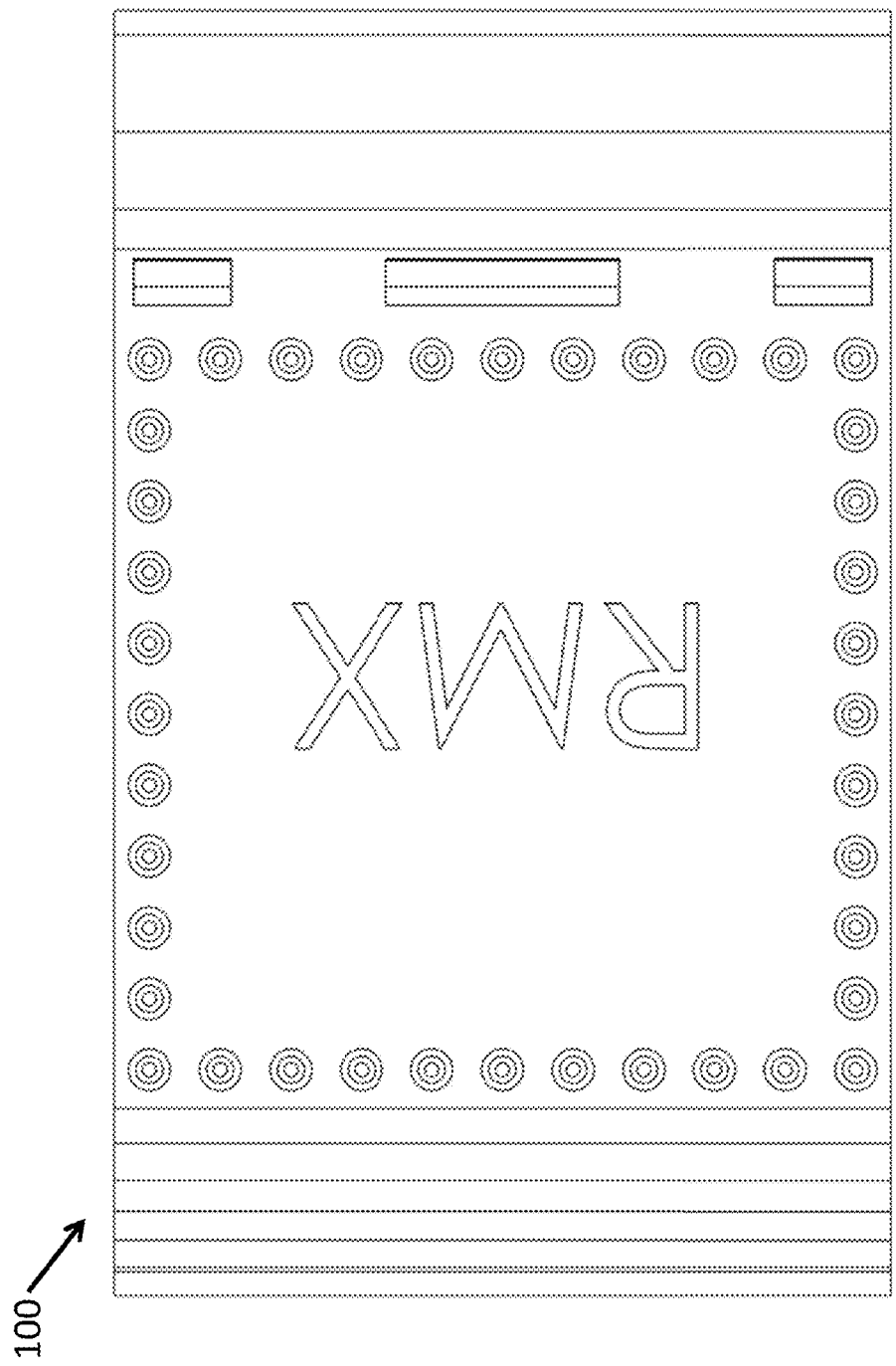
FIG. 9 is a top view of the releasable cable holder shown in FIGS. 7 and 8.
Figure 10:
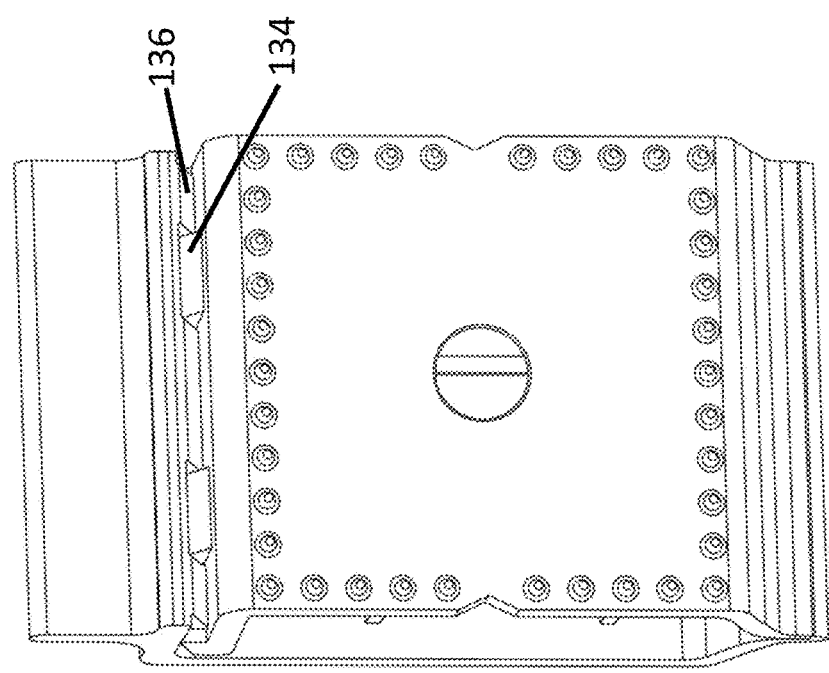
FIG. 10 is a bottom isometric view of the releasable cable holder shown in FIGS. 7-9.
Figure 23:
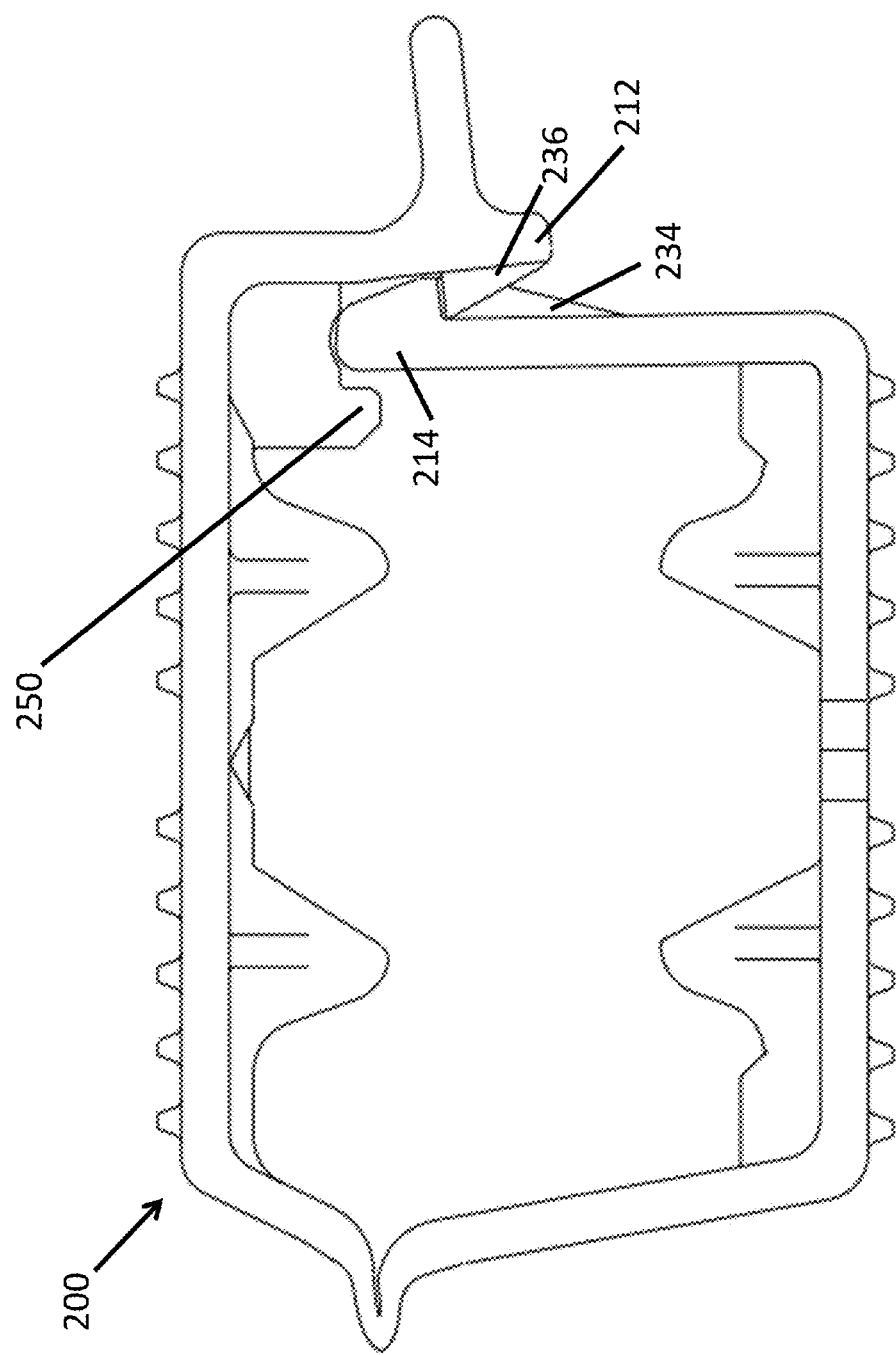
FIG. 23 is an end view of the releasable cable holder shown in FIG. 22.
Figure 24:
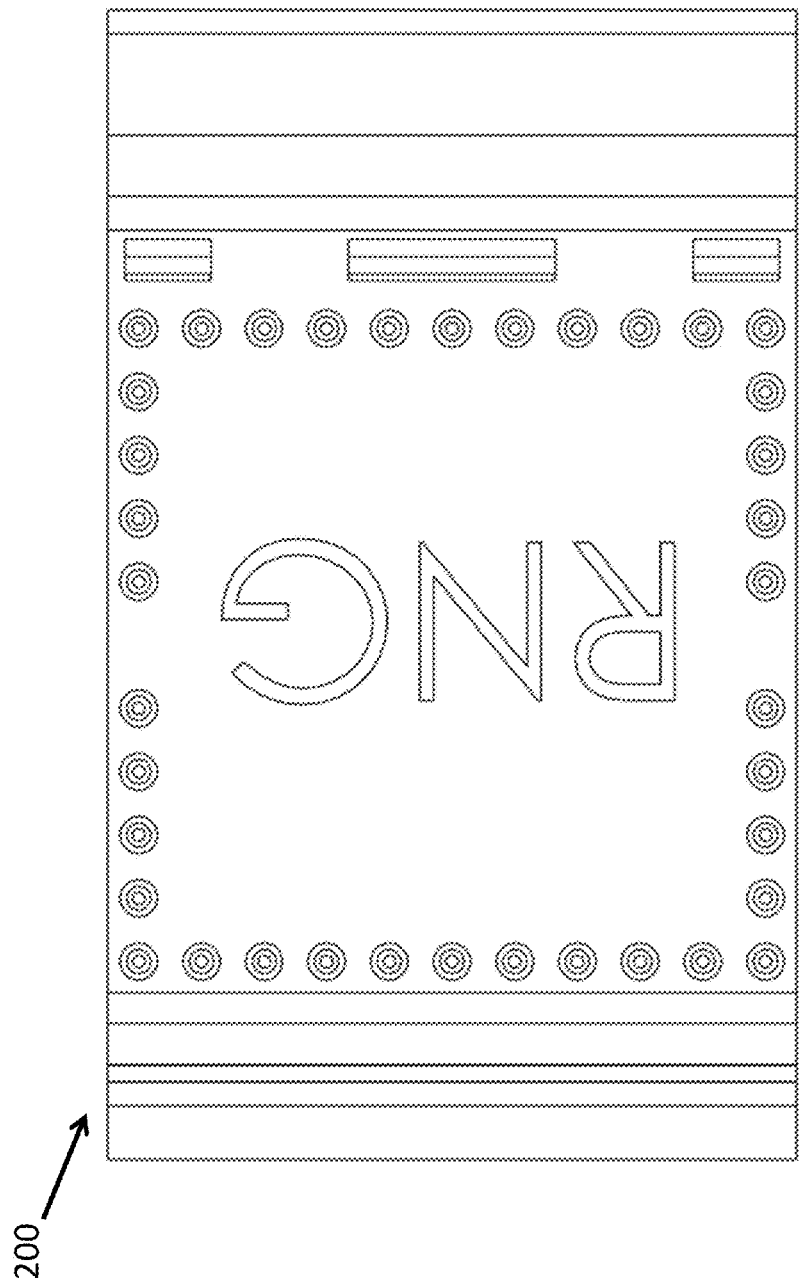
FIG. 24 is a top view of the releasable cable holder shown in FIGS. 22 and 23.
Figure 27:
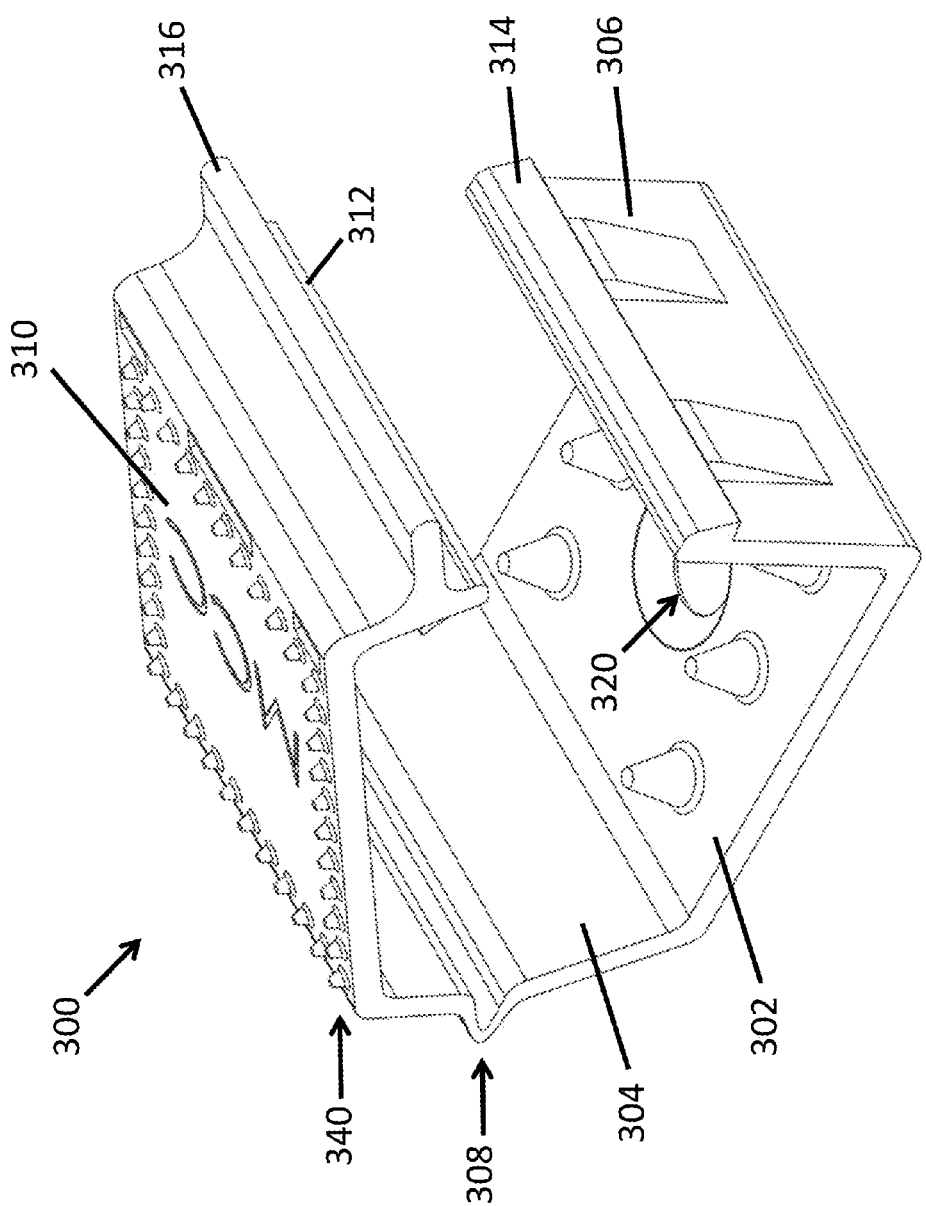
FIG. 27 is an isometric view of a third embodiment of a releasable cable holder in accordance with the principles of the present invention, shown in an unlatched position.
Figure 28:
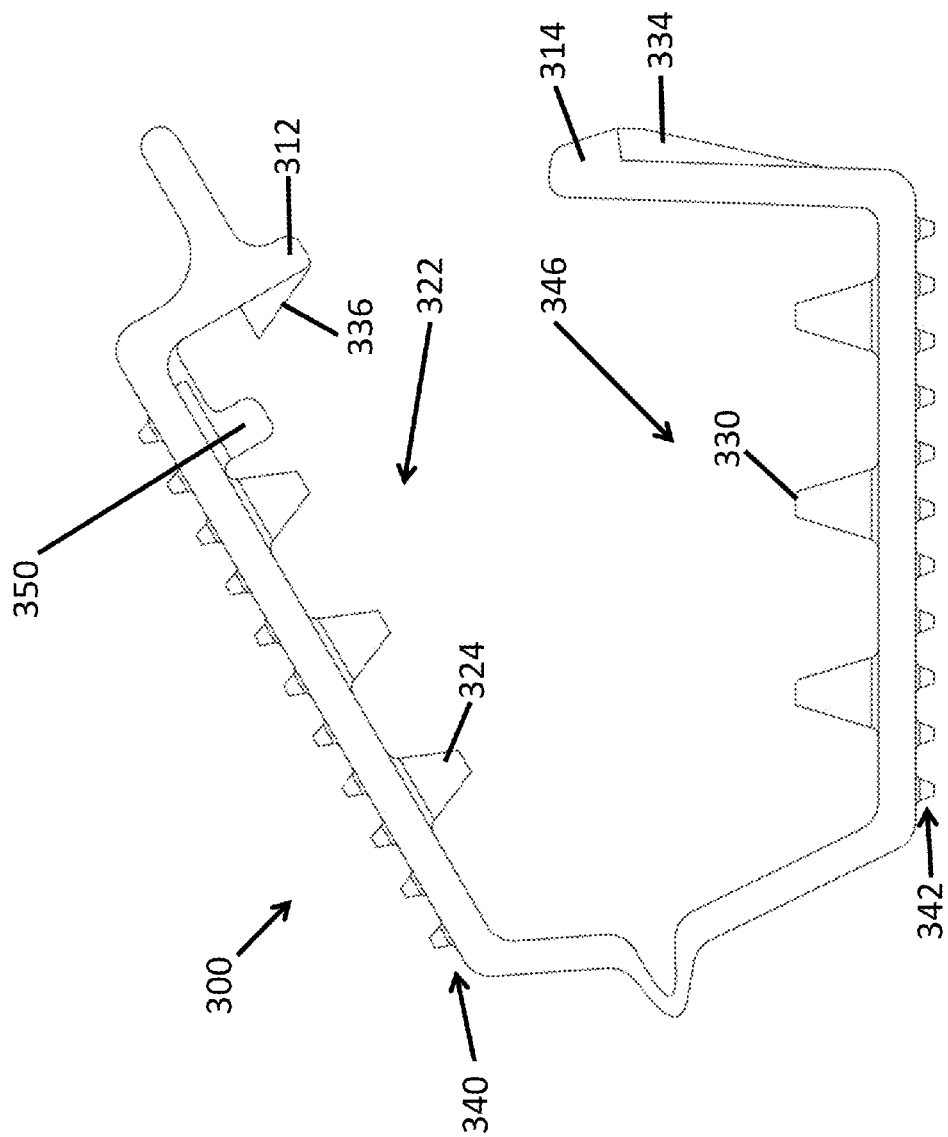
FIG. 28 is an end view of the releasable cable holder shown in FIG. 27.
Figure 29:
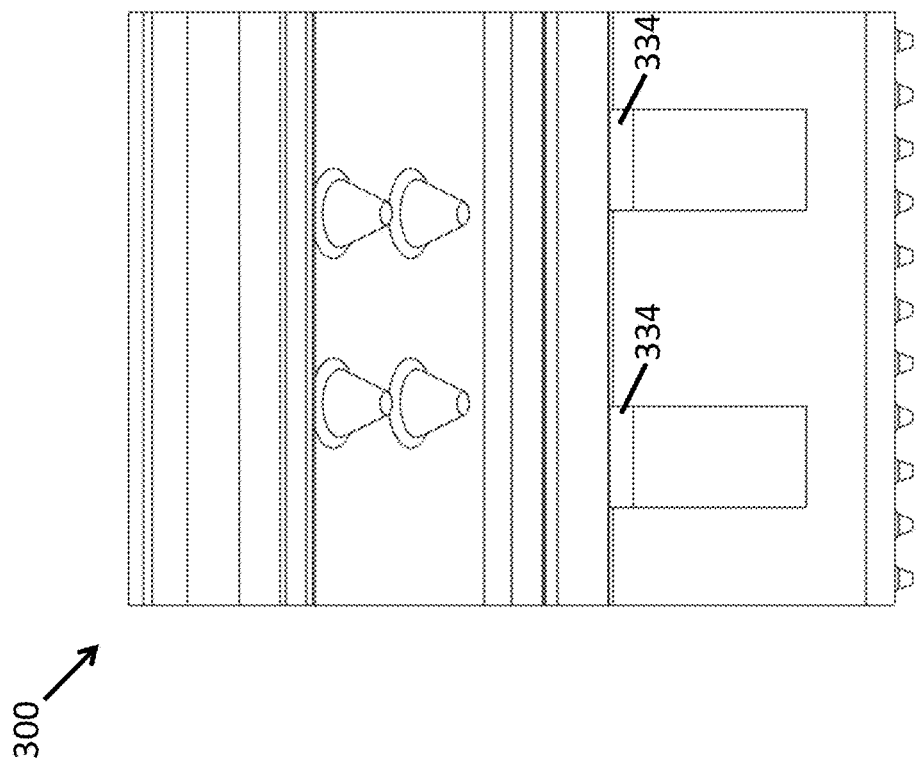
FIG. 29 is a right side view of the releasable cable holder shown in FIGS. 27 and 28.
Figure 37:
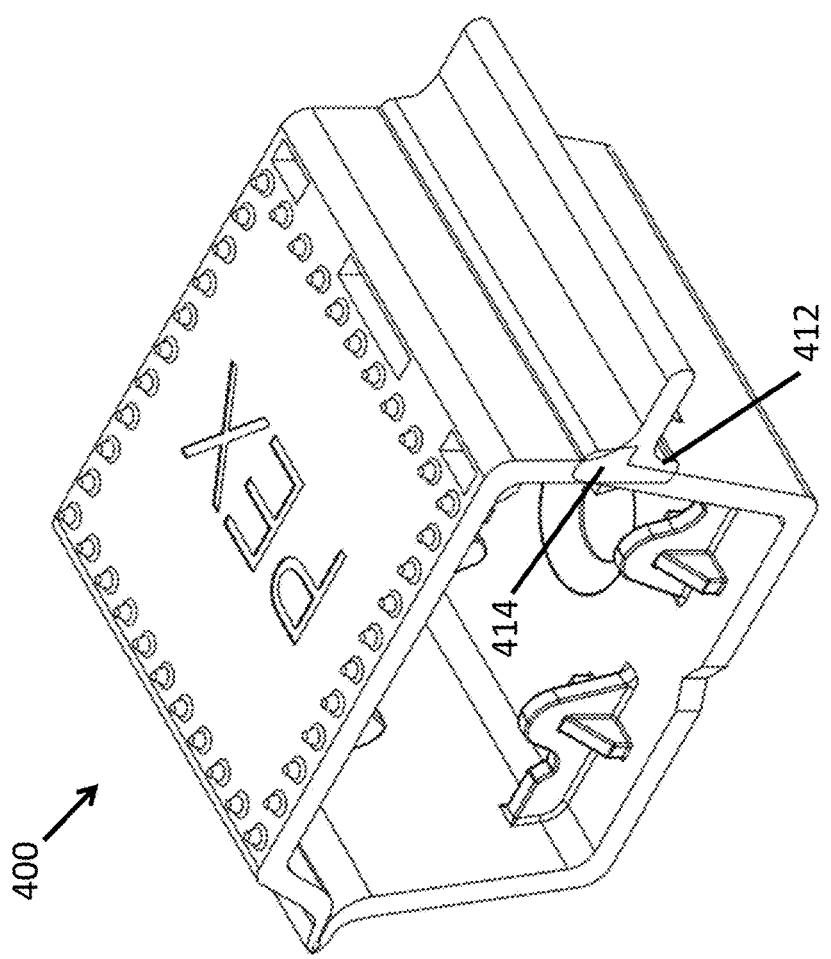
FIG. 37 is an isometric view of the releasable cable holder shown in FIGS. 31-36, but with the holder shown in a closed latched position.

FIGS. 37 and 38 shows similar overlapping lines, representing an unflexed, but inaccurate, position of latching lip 412 and corresponding lip 414. The overlap depicts the spring-like forces created between latching lip 412 and corresponding lip 414, resulting in a firm, secure latching mechanism. A more accurate representation of the fourth embodiment of FIG. 37 would look somewhat like what is shown in FIGS. 7 and 22; and a more accurate representation of the fourth embodiment of FIG. 38 would look somewhat like what is shown in FIGS. 8 and 23.

Any of the cable holders discussed above may also be used in a suspended ceiling environment, but attaching holder 100, holder 200, holder 300, or holder 400 to a piece of sheet metal designed to clip to the structural wires that dangle from a ceiling. For example, a holder 100 could be riveted to a sheet metal device known in the trade as a BAT WING, with the rivet extending through hole 120. The bat wing attaches to a structural wire, and the holder may releasably grip cables and other items, as discussed above.

Various descriptions of the embodiments are possible, and encompassed within the present disclosure. For example, a releasable cable holder includes a top cover and a bottom cover that define or form a channel. The top and bottom covers are approximately the same size. In some embodiments, the top cover may vary in size or shape from the bottom cover. The distance between the top and bottom covers is approximately ½ inch, however other embodiments may have shorter or longer distances between the top and bottom covers. The top and bottom covers oppose each other and form at least one channel in a closed position. In some embodiments, the top and bottom covers may be shaped to form one or more channels.

The top cover and bottom cover may have approximately 90° (degree) walls or lips on the lateral sides. These walls or lips are shaped to attach or connect a top cover to a bottom cover and to retain cables and wires within a channel. The top and bottom covers are configured to provide sufficient pressure on cables and wires within a channel to ensure the cables and wires are secure. In some embodiments, the top and bottom covers may have walls or lips that are greater or lesser than 90° (degrees) and/or may contain any suitable shape.

The walls or lips on one side of a releasable cable holder may form a flexible hinge that attaches the top and bottom covers together to facilitate the opening and closing of the releasable cable holder. On the opposite side of the flexible hinge, the walls or lips form a latching or snapping system to secure the top and bottom covers together. The top cover has an interlocking retaining lip and the bottom cover has a receiving lip. The interlocking retaining lip and the receiving lip snap or latch the top and bottom covers together. In some embodiments, the bottom cover may have an interlocking retaining lip and the top cover may have a receiving lip. The walls or lips may form a retaining platform on the bottom cover and a receiving platform on the top cover.

The releasable cable holders may have a tab attached to a top cover to help unlatch and/or open the releasable cable holder. Various shapes and sizes of the tab are possible. The top and bottom cover unlatches or opens on one side and remains attached at a flexible hinge. The flexible hinge provides a range of mobility between the top and bottom cover to support opening and closing the releasable cable holder. Additionally, in some embodiments the flexible hinge may be configured to adjust depending on the size or shape of the cables or wires. Cables and wires are placed on the retaining platform of the bottom cover.

Many of the embodiments have adhesive material on the bottom surface of the bottom cover. The adhesive material is used to attach the releasable cable holder to a surface. The adhesive material may be double-sided to provide a place of attachment to both the bottom cover and an underlying surface. The adhesive material is made to attach to most surfaces, including wood, metal, and plastic.

The adhesive material may be configured to absorb shock, stress and strain applied to a releasable cable holder to provide a durable connection between the releasable cable holder and underlying surface. The adhesive material may be made of any suitable material to absorb shock, stress and strain applied to a releasable cable holder, such as a foam core. It is noted that the drawings portray an adhesive material slightly smaller than the surface area of the bottom cover, but some embodiments may include adhesive materials sized substantially smaller or larger than the surface area of a bottom cover. In other embodiments, the adhesive material may be included on the bottom cover and top cover.

The adhesive material has a protective peel-off covering that may be removed from the adhesive material when ready to attach a releasable cable holder to a surface. In some embodiments, the protective peel-off covering may be longer or larger than the adhesive material to provide for easier removal of the covering when it may be difficult, such as when a user is wearing gloves.

In some embodiments, not shown, a releasable cable holder may include padding material within a channel. The padding material may be made of any suitable material, such as foam, rubber or cotton. The padding material may be located on the inner surface of the bottom cover, or on the inner surfaces of the top cover, or on the inner surfaces of both the bottom cover and the top cover.

In some embodiments, a releasable cable holder may include impediments or projections on the top and/or bottom covers that extend into the channel. The impediments or projections that extend into a channel are used to prevent movement of cables or wires by surrounding or pressing against the individual cable or wire. Various sizes and shapes are possible. The impediments or projections may be made of any suitable non-metallic or metallic material. In some embodiments the impediments or projections may be sized or shaped for various types of cables and wires. Additionally, in some embodiments, the impediments or projections may be incorporated from the top and/or bottom covers or may be a separate attachment.

In some embodiments, a releasable cable holder may include one or more holes to receive a nail, screw or staple. These holes can provide additional support to secure a releasable cable holder to a structure. The holes may be located on a bottom cover and/or on a separate attachment. Furthermore, there may be releasable cable holders that include more than one hole.

The releasable cable holder can be opened and closed as needed to add or remove cables or wires. Two or more releasable cable holders may be secured on top of one another.

The disclosed embodiments may be used to support CAT 5, RJ6 (TV) cable, or 14-2 thru 10-3 Romex wire. This includes 1 or 2 cat 5 (Ethernet wire), 1 or 2 (RJ6 cable), 1 or 2 14/2 non-metallic sheathed wire (Romex) 1- or 2 12/2 Romex wires, 1-10/2 Romex wire, 1-14/3 Romex, 1-12/3 Romex, or 1-10/3 Romex.

In many embodiments, a notch is formed in opposing sides of the bottom and of the top of the holder, forming a pair of opposing visual indicators on the bottom and another pair of opposing visual indicators on the top. The bottom typically is attached to a stud, and the opposing visual indicators help a user center the holder on a stud. The shape of the notch is also large enough to provide a tactile indicator to a user, so that the opposing indicators are also opposed tactile indicators defining an approximate centerline of the cable holder.

Hinge, to accomplish opening and closing upper and lower portions in concert with snap-latch Impediments, (on top and bottom portions that meet, grip, grab or impede lateral movement of "medium" within the closed latched embodiment.).

Snap-latch. Allows a firm closure to facilitate impediment action.

Center hole on lower portion of embodiment (for nail, screw, securement if desired or needed)

Bumps on outside of upper/lower portions of the embodiment. (For extra surface area for adhesive to stick to and for extra stick around the outside edges of embodiment.) Bumps on top portion make it perfect for "stacking" the embodiments. Bumps on the lower portion are for initial mounting of adhesive Width all four embodiments share a common width of 1-inch along the lateral length of the hinge.

Lift-off Tab makes re-opening simple, even with a gloved hand.

Anti-slide component (top part of snap-latch encompasses 2 matching bumps when snapped shut, so as to prevent the upper portion of the snap-latch from sliding laterally over the lower portion.

Centering dimple this is to aid in visual placement of embodiment onto where it is placed.

Bumps on outside of upper/lower portions of the embodiment. (For extra surface area for adhesive to stick to and for extra stick around the outside edges of embodiment.) Bumps on top portion make it perfect for "stacking" the embodiments. Bumps on the lower portion are for initial mounting of adhesive at time of manufacture.

RNG, MCC, and PEX share a common Closure-lock. The RNG, MCC, and PEX embodiments are dealing with a stiffer and robust wire or tubing. Normal stress conveyed to the embodiment will not accidently "pop open". Because of the pliability of wires and the type of sheathing, that incorporates the use of the RMX embodiment, I choose not to have a closure-lock. If the Romex wire is inadvertently yanked violently, so as to want to pull the wire out of the embodiment, I want the top portion of the RMX to pop open, freeing the wire from the embodiment, without tearing the outer sheath of the wire.

The following paragraphs may provide further information regarding example embodiments.

A0: A cable holder for securing cables and wires to an underlying structure comprising:
   a. a top and bottom cover with outer and inner surfaces;
   b. a space between the inner surface of the top and bottom cover forming a channel;
   c. a lateral lip on the top and bottom covers;
   d. a lateral wall on the top and bottom covers; and
   e. an adhesive material on the bottom cover.

A1: The cable holder of paragraph A0, wherein the lateral lip on the top and bottom covers contain a latching system adapted to snap or latch the top and bottom cover together.

A2: The cable holder of paragraph A1, wherein the top cover contains a tab adapted to unlatch or open the top and bottom covers.

A3: The cable holder of paragraph A0, wherein the lateral wall on the top and bottom covers contain a flexible hinge adapted to open and close the top and bottom covers and remain attached.

A4: The cable holder of paragraph A0, wherein the adhesive material on the bottom cover is double-sided.

A5: The cable holder of paragraph A4, wherein the adhesive material includes a foam core.

A6: The cable holder of paragraph A4, wherein the cable holder is adapted to stack one or more cable holders on top of one another.

A7: The cable holder of paragraph A6, wherein a first cable holder under a second cable holder is adapted to open and close while the first cable holder remains intact and secured.

A8: The cable holder of paragraph A0, wherein the top cover contains impediments that extend into the channel to secure cables and wires in the channel.

A9: The cable holder of paragraph A0, wherein the inner surface of the bottom cover contains padding material to protect and secure cables and wires in the channel.

A10: The cable holder of paragraph A0, wherein the cable holder contains one or more holes to receive a nail, screw, or staple.

A11: The cable holder of paragraph A0, wherein the cable holder contains a bracket that extends laterally that contains holes adapted to receive a nail, screw, or staple.

The disclosed embodiments dramatically improve installation of wires and other flexible items in buildings. Thus, the present disclosure includes several methods. For example, I disclose a method of attaching a cable to a building structure, with a step of providing a one-piece cable holder with a living hinge, a closeable body, and opposed indicators defining an approximate centerline of the cable holder. An electrician typically takes the additional step of adhering the holder on a stud in a building so that the approximate centerline of the cable holder is approximately parallel to a long axis of the stud, and then placing at least one cable on a portion of the holder. When the cable is properly positioned, another step includes closing the holder so that the cable is held on the stud by the holder.

The holder may be a first holder, and the method may include the steps of providing a second one-piece cable holder with a living hinge and a closeable body, and adhering the second one-piece cable holder on the first holder. Additional steps include placing at least one additional cable on a portion of the second holder, and then closing the second holder so that the one additional cable is held on the first holder and the stud by the second holder.

A user may take the step of opening the holder so that the cable may be removed or reoriented. For example, a user might take the steps of opening the holder, placing at least one additional cable on a portion of the holder, and then closing the holder so that both the cable and the one additional cable are held on the stud by the holder.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A releasable cable holder, comprising:
    a planar base plate, formed with sidewalls extending upward from the base plate;
    opposing visual indicators defining an approximate centerline of the cable holder, extending generally parallel to the sidewalls;
    a living hinge formed along one of the sidewalls, movably connecting a planar top cover to the one of the sidewalls;
    a latching lip formed on the top cover, distal from the living hinge;
    a corresponding lip formed on another of the sidewalls, distal from the living hinge;
    a first base ridge jutting out from the base plate and generally facing the top cover, the first base ridge extending between and reinforcing the sidewalls relative to the base plate;
    a second base ridge jutting out from the base plate and generally facing the top cover, the second base ridge extending between and reinforcing the sidewalls relative to the base plate, and being spaced substantially away from the first base ridge;
    a top set of impediments jutting out from the top cover and generally facing the base plate;
    a release tab extending out from the top cover adjacent the latching lip, and approximately parallel to the planar top cover; and
    a first sidewall abutment formed on the another of the sidewalls;
    a first corresponding abutment formed on the top cover adjacent the latching lip;
    a second sidewall abutment formed on the another of the sidewalls; and
    a second corresponding abutment formed on the top cover adjacent the latching lip, wherein:
    a cable may be placed on the base plate between the sidewalls;
    the top cover may be moved about the living hinge so that the latching lip clasps the corresponding lip to latch the top cover closed relative to the base plate;
    a cable placed on the base plate between the sidewalls may be gripped between the first base ridge and at least one of the impediments when the top cover is closed relative to the base plate;
    the first sidewall abutment aligns with and is immediately adjacent the first corresponding abutment and the second sidewall abutment aligns with and is immediately adjacent the second corresponding abutment but mirrored relative to the first sidewall abutment and the first corresponding abutment when the latching lip latches onto the corresponding lip, to limit sliding of the top cover relative to the base plate; and
    the release tab may be used to pull the latching lip away from the corresponding lip to unlatch the top cover to open the top cover to allow removal of the cable or placement of an additional cable.

2. The releasable cable holder according to claim 1, further comprising an adhesive face attached to the base plate, opposite from the top cover; wherein the adhesive face may be used to attach the base plate to an underlying structure.

3. The releasable cable holder according to claim 2, further comprising a top set of nubbins defining a top outer perimeter extending around the top cover, distal from the base plate, wherein the top outer perimeter is sized to be larger than the adhesive face.

4. The releasable cable holder according to claim 3, further comprising a base set of nubbins defining a base outer perimeter extending around the base plate, distal from the top cover, wherein the base outer perimeter is sized to be larger than the adhesive face.

5. The releasable cable holder according to claim 2, further comprising a base set of nubbins defining a base outer perimeter extending around the base plate, distal from the top cover, wherein the base outer perimeter is sized to be larger than the adhesive face.

6. The releasable cable holder according to claim 2, further comprising a hole formed in the base, wherein the hole may receive a fastener to additionally connect the base to the underlying structure.

7. The releasable cable holder according to claim 1, further comprising:
a base set of impediments jutting out from the base plate and generally facing the top cover;
wherein a cable placed on the base plate between the sidewalls may be gripped by at least some of the impediments when the top cover is closed relative to the base plate.

8. The releasable cable holder according to claim 1, wherein the first base ridge includes a first central impediment jutting out from the first base ridge and away from the base plate.

9. The releasable cable holder according to claim 8, wherein the second base ridge includes a second central impediment jutting out from the second base ridge and away from the base plate.

10. The releasable cable holder according to claim 1, wherein the top set of impediments include a long impediment and a short impediment, so that a distal end of the long impediment is closer to the first base ridge, relative to a distal end of the short impediment, when the top cover is closed relative to the base plate.

11. The releasable cable holder according to claim 1, further wherein at least one of the opposing visual indicators is a notch.

12. A releasable cable holder, comprising:
a planar base plate, formed with sidewalls;
opposing indicators formed at opposite ends of an approximate centerline of the planar base plate;
a living hinge formed along one of the sidewalls, movably connecting a planar top cover to the one of the sidewalls;
a latching lip formed on the top cover, distal from the living hinge;
a corresponding lip formed on another of the sidewalls, distal from the living hinge;
a release tab extending out from the top cover adjacent the latching lip, and approximately parallel to the planar top cover;
a first sidewall abutment formed on the another of the sidewalls;
a first corresponding abutment formed on the top cover adjacent the latching lip;
a second sidewall abutment formed on the another of the sidewalls; and
a second corresponding abutment formed on the top cover adjacent the latching lip; and
a first base ridge jutting out from the base plate and generally facing the top cover, the first base ridge extending between and reinforcing the sidewalls relative to the base plate;
a second base ridge jutting out from the base plate and generally facing the top cover, the second base ridge extending between and reinforcing the sidewalls relative to the base plate, and being spaced substantially away from the first base ridge;
a top set of impediments jutting out from the top cover and generally facing the base plate;
wherein:
a cable may be placed on the base plate between the sidewalls;
the top cover may be moved about the living hinge so that the latching lip clasps the corresponding lip to latch the top cover closed relative to the base plate, and so that a cable may be gripped between the first base ridge and at least some of the impediments when the top cover is closed relative to the base plate;
the release tab may be used to pull the latching lip away from the corresponding lip to unlatch the top cover to open the top cover to allow removal of the cable or placement of an additional cable; and
the first sidewall abutment aligns with and is immediately adjacent the first corresponding abutment and the second sidewall abutment aligns with and is immediately adjacent the second corresponding abutment but mirrored relative to the first sidewall abutment and the first corresponding abutment when the latching lip latches onto the corresponding lip, to limit sliding of the top cover relative to the base plate.

13. The releasable cable holder according to claim 12, further comprising an adhesive face attached to the base plate, opposite from the top cover, wherein the adhesive face may be used to attach the base plate to an underlying structure.

14. The releasable cable holder according to claim 12, further wherein at least one of the opposing indicators is a notch.

15. A releasable cable holder, comprising:
a planar base plate;
sidewalls extending upward from the base plate;
opposing indicators formed at opposite ends of an approximate centerline of the planar base plate;
a living hinge formed along one of the sidewalls, movably connecting a planar top cover to the one of the sidewalls;
a first base ridge jutting out from the base plate and generally facing the top cover, the first base ridge extending between and reinforcing the sidewalls relative to the base plate;
a second base ridge jutting out from the base plate and generally facing the top cover, the second base ridge extending between and reinforcing the sidewalls relative to the base plate, and being spaced substantially away from the first base ridge;
a top set of impediments jutting out from the top cover and generally facing the base plate;
a latching lip formed on the top cover, distal from the living hinge;
a corresponding lip formed on another of the sidewalls, distal from the living hinge;
a release tab extending out from the top cover adjacent the latching lip, and approximately parallel to the planar top cover;
a first sidewall abutment formed on the another of the sidewalls;
a first corresponding abutment formed on the top cover adjacent the latching lip;
a second sidewall abutment formed on the another of the sidewalls;
a second corresponding abutment formed on the top cover adjacent the latching lip; and
an adhesive face attached to the base plate, opposite from the top cover;
wherein the release tab may be used to pull the latching lip away from the corresponding lip to unlatch the top cover to open the top cover to allow removal of the cable or placement of an additional cable;
wherein the first sidewall abutment aligns with and is immediately adjacent the first corresponding abutment and the second sidewall abutment aligns with and is immediately adjacent the second corresponding abutment but mirrored relative to the first sidewall abutment and the first corresponding abutment when the latching lip latches onto the corresponding lip, to limit sliding of the top cover relative to the base plate;

wherein a cable placed on the base plate between the sidewalls may be gripped between the first base ridge and at least one of the impediments when the top cover is closed relative to the base plate; and wherein the adhesive face may be used to attach the base plate to an underlying structure or to a second releasable cable holder.

\* \* \* \* \*